(12) United States Patent
Kikuchi

(10) Patent No.: US 11,554,968 B2
(45) Date of Patent: Jan. 17, 2023

(54) POSITIVE ELECTRODE ACTIVE SUBSTANCE FOR LITHIUM SECONDARY BATTERY AND LITHIUM SECONDARY BATTERY

(71) Applicant: NIPPON CHEMICAL INDUSTRIAL CO., LTD., Tokyo (JP)

(72) Inventor: Masahiro Kikuchi, Tokyo (JP)

(73) Assignee: NIPPON CHEMICAL INDUSTRIAL CO., LTD., Tokyo (JP)

( * ) Notice: Subject to any disclaimer, the term of this patent is extended or adjusted under 35 U.S.C. 154(b) by 0 days.

(21) Appl. No.: 17/635,521

(22) PCT Filed: Aug. 27, 2020

(86) PCT No.: PCT/JP2020/032373
§ 371 (c)(1),
(2) Date: Feb. 15, 2022

(87) PCT Pub. No.: WO2021/049310
PCT Pub. Date: Mar. 18, 2021

(65) Prior Publication Data
US 2022/0298025 A1    Sep. 22, 2022

(30) Foreign Application Priority Data

Sep. 11, 2019 (JP) .............................. JP2019-165229
Mar. 4, 2020 (JP) .............................. JP2020-036693

(51) Int. Cl.
*C01G 51/00* (2006.01)
(52) U.S. Cl.
CPC ........... *C01G 51/42* (2013.01); *C01G 51/006* (2013.01); *C01G 51/66* (2013.01)

(58) Field of Classification Search
CPC ...... C01G 51/42; C01G 51/006; C01G 51/66; C01G 51/00; Y02E 60/10; H01M 4/36;
(Continued)

(56) References Cited

U.S. PATENT DOCUMENTS

2012/0273737 A1    11/2012    Ooishi
2014/0050993 A1    2/2014    Park
(Continued)

FOREIGN PATENT DOCUMENTS

JP    5-266889 A    10/1993
JP    2000-268821 A    9/2000
(Continued)

OTHER PUBLICATIONS

International Search Report dated Nov. 10, 2020, issued in counterpart International Application No. PCT/JP2020/032373 (3 pages).

*Primary Examiner* — Andrew J. Oyer
(74) *Attorney, Agent, or Firm* — WHDA, LLP

(57) ABSTRACT

An object of the present invention is to provide a positive electrode active substance for a lithium secondary battery, the positive electrode active substance, when being used as a positive electrode active substance for a lithium secondary battery, being little in deterioration of cycle characteristics and being high in the energy density retention rate, even in repetition of charge and discharge at high voltages, and a lithium secondary battery little in deterioration of cycle characteristics and high in the energy density retention rate, even in repetition of charge and discharge at high voltages. The positive electrode active substance for a lithium secondary battery comprises a lithium cobalt-based composite oxide particle having a Ti-containing compound and an Mg-containing compound adhered on at least part of the particle surface.

5 Claims, 5 Drawing Sheets

(58) Field of Classification Search
CPC .. H01M 4/505; H01M 4/525; H01M 10/0525; H01M 4/366; H01M 10/052; H01M 2004/028; C01P 2002/72; C01P 2004/61; C01P 2006/12; C01P 2006/40; C01P 2002/70
See application file for complete search history.

(56) References Cited

U.S. PATENT DOCUMENTS

| | | |
|---|---|---|
| 2014/0212759 A1 | 7/2014 | Blangero et al. |
| 2015/0221933 A1 | 8/2015 | Mizawa et al. |
| 2018/0013130 A1 | 1/2018 | Ochiai et al. |
| 2018/0248179 A1 | 8/2018 | Wang et al. |
| 2019/0148711 A1* | 5/2019 | Jo ................... H01M 4/36 429/231.95 |

FOREIGN PATENT DOCUMENTS

| | | |
|---|---|---|
| JP | 2003-20229 A | 1/2003 |
| JP | 2005-123111 A | 5/2005 |
| JP | 2013-182757 A | 9/2013 |
| JP | 2013-182758 A | 9/2013 |
| JP | 2014-523840 A | 9/2014 |
| JP | 2018-523277 A | 8/2018 |
| JP | 2018-206747 A | 12/2018 |
| JP | 7030865 B2 | 3/2022 |
| WO | 2011/043296 A1 | 4/2011 |
| WO | 2012/171780 A1 | 12/2012 |
| WO | 2014/049964 A1 | 4/2014 |
| WO | 2015/016190 A1 | 2/2015 |
| WO | 2018/007908 A1 | 1/2018 |

\* cited by examiner

POSITIVE ELECTRODE ACTIVE SUBSTANCE FOR LITHIUM SECONDARY BATTERY AND LITHIUM SECONDARY BATTERY

TECHNICAL FIELD

The present invention relates to a positive electrode active substance for a lithium secondary battery, and a lithium secondary battery using the positive electrode active substance.

BACKGROUND ART

In recent years, along with rapid progress of making household appliances portable and cordless, lithium ion secondary batteries have been put in practical use as power sources of small electronic devices such as laptop personal computers, mobile phones and video cameras. With regard to the lithium ion secondary batteries, since Mizushima et al. reported in 1980 that lithium cobaltate is useful as a positive electrode active substance of a lithium ion secondary battery, research and development of lithium-based composite oxides has been actively progressed and many proposals have been made.

Lithium secondary batteries using lithium cobaltate, however, have a problem of deterioration of cycle characteristics due to dissolving-out of cobalt atoms, and the like.

Patent Literature 1 below proposes a lithium secondary battery using, as a positive electrode active substance, a lithium cobalt-based composite oxide having an existence proportion of titanium on the particle surface of lithium cobaltate of 20% or higher. Patent Literature 2 below proposes a positive electrode active substance for a lithium secondary battery composed of a lithium transition metal composite oxide containing 0.20 to 2.00% by weight of Ti atoms, wherein as the positive electrode active substance, used is a lithium cobalt-based composite oxide in which the above Ti atoms are present from the particle surface of the lithium transition metal composite oxide to the depth direction and have a concentration gradient becoming the maximum at the particle surface. Further Patent Literature 3 and Patent Literature 4 below propose using, as a positive electrode active substance, a lithium cobalt-based composite oxide containing Sr atoms and Ti atoms.

CITATION LIST

Patent Literature

Patent Literature 1: Japanese Patent Laid-Open No. 2005-123111
Patent Literature 2: International Publication No. WO2011/043296
Patent Literature 3: Japanese Patent Laid-Open No. 2013-182758
Patent Literature 4: Japanese Patent Laid-Open No. 2013-182757

DISCLOSURE OF INVENTION

Technical Problem

In recent years, further improvement in the energy density of lithium ion batteries has been demanded. One of means thereof includes voltage elevation such as elevation of the charge end voltage of batteries. Even in these conventional technologies, however, repetition of charge and discharge at high voltages poses a problem of deteriorating cycle characteristics.

Therefore, an object of the present invention is to provide a positive electrode active substance for a lithium secondary battery, the positive electrode active substance, when being used as a positive electrode active substance for a lithium secondary battery, being little in deterioration of cycle characteristics and being high in the energy density retention rate, even in repetition of charge and discharge at high voltages, and a lithium secondary battery little in deterioration of cycle characteristics and high in the energy density retention rate, even in repetition of charge and discharge at high voltages.

Solution to Problem

As a result of exhaustive studies in consideration of the above real situation, the present inventor has found that a lithium secondary battery using, as its positive electrode active substance, a material in which a specific compound is adhered on surface of a particle of a lithium cobalt-based composite oxide becomes a lithium secondary battery little in deterioration of cycle characteristics and high in the energy density retention rate, even in repetition of charge and discharge at high voltages, and this finding has led to the completion of the present invention.

That is, the present invention (1) provides a positive electrode active substance for a lithium secondary battery, comprising a lithium cobalt-based composite oxide particle having a Ti-containing compound and an Mg-containing compound adhered on at least part of the particle surface.

Then, the present invention (2) provides the positive electrode active substance for a lithium secondary battery according to (1), wherein the Ti-containing compound is an oxide containing Ti.

Then, the present invention (3) provides the positive electrode active substance for a lithium secondary battery according to (1) or (2), wherein the amount of the Ti-containing compound adhered is, in terms of atom, with respect to Co in the lithium cobalt-based composite oxide particle, 0.01 to 5.00% by mol as Ti.

Then, the present invention (4) provides the positive electrode active substance for a lithium secondary battery according to any one of (1) to (3), wherein the Mg-containing compound is one or two or more selected from magnesium sulfate, magnesium oxide and composite compounds of titanium and magnesium.

Then, the present invention (5) provides the positive electrode active substance for a lithium secondary battery according to any one of (1) to (4), wherein the Mg-containing compound is magnesium sulfate.

Then, the present invention (6) provides the positive electrode active substance for a lithium secondary battery according to any one of (1) to (5), wherein the amount of the Mg-containing compound adhered is, in terms of atom, with respect to Co in the lithium cobalt-based composite oxide particle, 0.01 to 5.00% by mol as Mg.

Then, the present invention (7) provides the positive electrode active substance for a lithium secondary battery according to any one of (1) to (6), wherein the lithium cobalt-based composite oxide particle contains, other than Li, Co and 0, one or two or more M elements (M is Mg, Al, Ti, Zr, Cu, Fe, Sr, Ca, V, Mo, Bi, Nb, Si, Zn, Ga, Ge, Sn, Ba, W, Na, K, Ni or Mn).

Then, the present invention (8) provides the positive electrode active substance for a lithium secondary battery according to (7), wherein the M element is one or two or more selected from Ti, Mg and Ca.

Then, the present invention (9) provides the positive electrode active substance for a lithium secondary battery according to any one of (1) to (8), wherein the lithium cobalt-based composite oxide particle contains cobalt oxide ($Co_3O_4$).

Then, the present invention (10) provides the positive electrode active substance for a lithium secondary battery according to (9), wherein with regard to the content of cobalt oxide ($Co_3O_4$), when the lithium cobalt-based composite oxide is X-ray diffractometrically analyzed using a CuKα line as a line source, the ratio ((A/B)×100) of the intensity (A) of the diffraction peak in the region of 2θ=36.8° caused by $Co_3O_4$ to the intensity (B) of the diffraction peak in the region of 2θ=37.4° caused by $LiCoO_2$ is higher than 0.6% and 5.0% or lower.

Then, the present invention (11) provides the positive electrode active substance for a lithium secondary battery according to any one of (1) to (10), the positive electrode active substance being obtained by dry mixing a lithium cobalt-based composite oxide particle, an inorganic Mg-containing compound and an inorganic Ti-containing compound to thereby obtain a mixed material of the lithium cobalt-based composite oxide particle, the inorganic Mg-containing compound and the inorganic Ti-containing compound, and then heat-treating the mixed material at 400 to 1,000° C.

Then, the present invention (12) provides the positive electrode active substance for a lithium secondary battery according to any one of (1) to (10), the positive electrode active substance being obtained by dry mixing a lithium cobalt-based composite oxide particle, an inorganic Mg-containing compound and an inorganic Ti-containing compound to thereby obtain a mixed material of the lithium cobalt-based composite oxide particle, the inorganic Mg-containing compound and the inorganic Ti-containing compound, and then heat-treating the mixed material at 750 to 1,000° C.

Then, the present invention (13) provides a method for producing a positive electrode active substance for a lithium secondary battery, the method comprising dry mixing a lithium cobalt-based composite oxide particle, an inorganic Mg-containing compound and an inorganic Ti-containing compound to thereby obtain a mixed material of the lithium cobalt-based composite oxide particle, the inorganic Mg-containing compound and the inorganic Ti-containing compound, and then heat-treating the mixed material at 400 to 1,000° C. to thereby obtain the positive electrode active substance for a lithium secondary battery.

Then, the present invention (14) provides a lithium secondary battery, the lithium secondary battery using a positive electrode active substance for a lithium secondary battery according to any one of (1) to (12).

Advantageous Effects of Invention

According to the present invention, there can be provided a positive electrode active substance for a lithium secondary battery, the positive electrode active substance, when being used as a positive electrode active substance for a lithium secondary battery, being little in deterioration of cycle characteristics and being high in the energy density retention rate, even in repetition of charge and discharge at high voltages, and a lithium secondary battery little in deterioration of cycle characteristics and high in the energy density retention rate, even in repetition of charge and discharge at high voltages.

DESCRIPTION OF EMBODIMENTS

Figure 1:
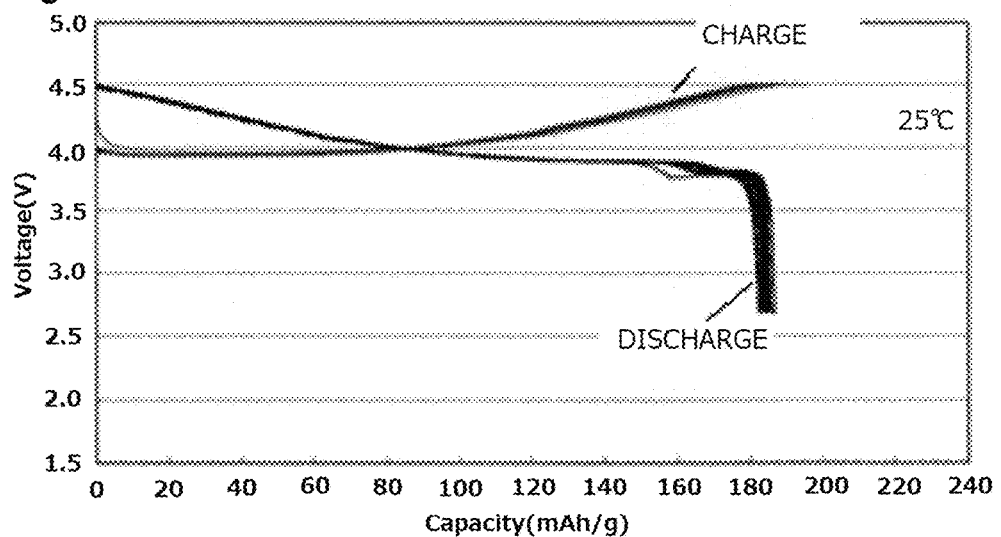
FIG. 1 is a diagram of charge and discharge characteristics of a lithium secondary battery using a positive electrode active substance sample obtained in Example 1.

The positive electrode active substance for a lithium secondary battery of the present invention is a positive electrode active substance for a lithium secondary battery, comprising a lithium cobalt-based composite oxide particle having a Ti-containing compound and an Mg-containing compound adhered on at least part of the particle surface. That is, the positive electrode active substance for a lithium secondary battery of the present invention is an aggregate of a lithium cobalt-based composite oxide particle having a Ti-containing compound and an Mg-containing compound present on at least part of the particle surface.

Therefore, in the lithium cobalt-based composite oxide particle constituting the positive electrode active substance for a lithium secondary battery of the present invention, the Ti-containing compound and the Mg-containing compound are adhered on part of the particle surface, or the Ti-containing compound and the Mg-containing compound are adhered so as to cover the entire of the particle surface. Here, the Ti-containing compound being adhered on part of the particle surface refers to a state that the particle surface has exposed portions excluding the Ti-containing compound in the surface of the object to be covered. Further, the Mg-containing compound being adhered on part of the particle surface refers to a state that the particle surface has exposed portions excluding the Mg-containing compound in the surface of the object to be covered.

A lithium cobalt-based composite oxide forming a lithium cobalt-based composite oxide particle relevant to the positive electrode active substance for a lithium secondary battery of the present invention is a composite oxide containing, at least, lithium and cobalt.

In the lithium cobalt-based composite oxide, the molar ratio (Li/Co) in terms of atom of Li to Co is preferably 0.90 to 1.20 and especially preferably 0.95 to 1.15. Due to that the molar ratio (Li/Co) in terms of atom of Li to Co in the lithium cobalt-based composite oxide is in the above range, the energy density of the positive electrode active substance for a lithium secondary battery becomes high.

The lithium cobalt-based composite oxide, for the purpose of improving the performance or the physical properties can contain any one or two or more among M elements indicated below, as required. The M element the lithium cobalt-based composite oxide contains Mg, Al, Ti, Zr, Cu, Fe, Sr, Ca, V, Mo, Bi, Nb, Si, Zn, Ga, Ge, Sn, Ba, W, Na, K, Ni or Mn, as required.

In that the battery characteristics such as the cycle characteristics, the operation voltage and further the rate characteristics become much higher, it is preferable to contain one or two or more selected from Ti, Mg and Ca; and it is especially preferable to contain Mg and Ca as the M element.

When the lithium cobalt-based composite oxide contains an M element, the % by mol ((M/Co)×100) in terms of atom of the M element to Co in the lithium cobalt-based composite oxide is preferably 0.01 to 5.00% by mol and especially preferably 0.05 to 2.00% by mol. When the lithium cobalt-based composite oxide contains the M element, due to that the % by mol ((M/Co)×100) in terms of atom of the M element to Co in the lithium cobalt-based composite oxide is in the above range, the battery characteristics can be improved without impairing the charge and discharge capacities. Then, when the lithium cobalt-based composite oxide contains two or more M elements, the molar number in terms of atom of the M elements, which becomes the basis of the calculation of the % by mol, refers to the total of molar numbers of the M elements.

Then, when the lithium cobalt-based composite oxide contains, as the M element, one or two or more selected from Ti, Mg and Ca, the % by mol ((M/Co)×100) in terms of atom of the M element to Co in the lithium cobalt-based composite oxide is preferably 0.01 to 5.00% by mol and especially preferably 0.05 to 2.00% by mol. When the lithium cobalt-based composite oxide contains, as the M element, one or two or more selected from Ti, Mg and Ca, due to that the % by mol ((M/Co)×100) in terms of atom of the M element to Co in the lithium cobalt-based composite oxide is in the above range, there can be satisfied simultaneously both of the high charge and discharge capacities and the battery characteristics such as the cycle characteristics, the operation voltage, the load characteristics and the safety.

In the case where the lithium cobalt-based composite oxide contains Ti as the M element, the % by mol ((Ti/Co)× 100) in terms of atom of Ti to Co in the lithium cobalt-based composite oxide is preferably 0.01 to 5.00% by mol and especially preferably 0.05 to 2.00% by mol. When the lithium cobalt-based composite oxide contains Ti as the M element, due to that the % by mol ((Ti/Co)×100) in terms of atom of Ti to Co in the lithium cobalt-based composite oxide is in the above range, there can especially be improved the battery characteristics such as the cycle characteristics, the operation voltage and further the load characteristics.

In the case where the lithium cobalt-based composite oxide contains Mg as the M element, the % by mol ((Mg/ Co)×100) in terms of atom of Mg to Co in the lithium cobalt-based composite oxide is preferably 0.01 to 5.00% by mol and especially preferably 0.05 to 2.00% by mol. When the lithium cobalt-based composite oxide contains Mg as the M element, due to that the % by mol ((Mg/Co)×100) in terms of atom of Mg to Co in the lithium cobalt-based composite oxide is in the above range, there can especially be improved the battery characteristics such as the cycle characteristics, the load characteristics and the safety.

In the case where the lithium cobalt-based composite oxide contains Ca as the M element, the % by mol ((Ca/ Co)×100) in terms of atom of Ca to Co in the lithium cobalt-based composite oxide is preferably 0.01 to 5.00% by mol and especially preferably 0.05 to 2.00% by mol. When the lithium cobalt-based composite oxide contains Ca as the M element, due to that the % by mol ((Ca/Co)×100) in terms of atom of Ca to Co in the lithium cobalt-based composite oxide is in the above range, there can especially be improved the battery characteristics such as the cycle characteristics, the load characteristics and the safety.

The M element may be present in the interior of the lithium cobalt-based composite oxide particle, may be present on the surface of the lithium cobalt-based composite oxide particle, or may be present both in the particle interior of and on the particle surface of the lithium cobalt-based composite oxide particle.

In the case where the M element is present on the particle surface of the lithium cobalt-based composite oxide, the M element may also be present in a form of an oxide, a composite oxide, a sulfate salt, a phosphate salt or the like.

Then, the lithium cobalt-based composite oxide may contain cobalt oxide ($Co_3O_4$) originated from cobalt oxide ($CO_3O_4$) of a raw material in production of the lithium cobalt-based composite oxide. With regard to the content of cobalt oxide ($Co_3O_4$), when the lithium cobalt-based composite oxide is X-ray diffractometrically analyzed using a CuKα line as a line source, it is preferable that the ratio ((A/B)×100) of the intensity (A) of the diffraction peak in the region of $2\theta=36.8°$ caused by $Co_3O_4$ to the intensity (B) of the diffraction peak in the region of $2\theta=37.4°$ caused by $LiCoO_2$ is preferably higher than 0.6% and 5.0% or lower and especially preferably 0.8 to 2.5%, from the viewpoint that there can be obtained a lithium secondary battery less in deterioration of cycle characteristics and higher in the energy density retention rate, even in repetition of charge and discharge at high voltages.

Here, in the present invention, the ratio of intensities of diffraction peaks is determined from a ratio of heights of the diffraction peaks.

Then, the lithium cobalt-based composite oxide particle is a particulate of the lithium cobalt-based composite oxide.

The lithium cobalt-based composite oxide particle is produced, for example, by carrying out a raw material mixing step of preparing a raw material mixture containing a lithium compound and a cobalt compound, and then carrying out a firing step of firing the obtained raw material mixture.

The lithium compound relevant to the raw material mixing step is not especially limited as long as being a lithium compound usually used as a raw material for production of lithium cobalt-based composite oxides, and includes an oxide, a hydroxide, a carbonate salt, a nitrate salt, a sulfate salt and organic acid salts of lithium.

The cobalt compound relevant to the raw material mixing step is not especially limited as long as being a cobalt compound usually used as a raw material for production of lithium cobalt-based composite oxides, and includes an oxide, an oxyhydroxide, a hydroxide, a carbonate salt, a nitrate salt, a sulfate salt and organic acid salts of cobalt.

In the raw material mixing step, the mixing proportion of the lithium compound and the cobalt compound is, in the molar ratio (Li/Co molar ratio) of the molar number of Li to the molar number of Co, preferably 0.90 to 1.20 and especially preferably 0.95 to 1.15. Due to that the mixing proportion of the lithium compound and the cobalt compound is in the above range, it becomes easy for a single phase of a lithium cobalt-based composite oxide to be obtained.

In order to obtain the lithium cobalt-based composite oxide containing cobalt oxide ($Co_3O_4$), by making the mixing proportion of the lithium compound and the cobalt compound in the molar ratio (Li/Co molar ratio) in terms of atom of the molar number of Li to the molar number of Co to be 0.950 to 1.000, preferably 0.960 to 0.999 and preferably making the firing temperature described later to be higher than 1,000° C., it becomes easy for a lithium cobalt-based composite oxide containing cobalt oxide ($CO_3O_4$) in the above content of cobalt oxide ($Co_3O_4$) to be obtained.

In the raw material mixing step, the raw material mixture can be mixed with a compound containing an M element.

Compounds containing an M element include oxides, hydroxides, carbonate salts, nitrate salts, sulfate salts, fluorides and organic acid salts containing the M element. Compounds containing two or more M elements may be used.

It is preferable, in order to produce a high-purity lithium cobalt-based composite oxide particle, that the lithium compound, the cobalt compound and the compound containing the M element as raw materials, though regardless of the production history, have an impurity content as low as possible.

In the raw material mixing step, examples of a method of mixing the lithium compound, the cobalt compound, and the compound containing an M element to be used as required include mixing methods using a ribbon mixer, a Henschel mixer, a Supermixer, a Nauta mixer or the like. Then, for a mixing method on a laboratory level, a household mixer suffices.

The firing step is a step of firing the raw material mixture obtained by carrying out the raw material mixing step to thereby obtain the lithium cobalt-based composite oxide.

In the firing step, the firing temperature when the raw material mixture is fired to react the raw materials is 800 to 1,150° C. and preferably 900 to 1,100° C. Due to that the firing temperature is in the above range, remaining of unreacted cobalt oxide than necessary causing the capacity reduction of the lithium cobalt-based composite oxide can be suppressed, and formation of superheated decomposition products of the lithium cobalt-based composite oxide can be made little.

In order to obtain the lithium cobalt-based composite oxide containing cobalt oxide ($CO_3O_4$), it is preferable that the firing temperature is made to be preferably higher than 1,000° C. and 1,100° C. or lower, from the viewpoint that it becomes easy for cobalt oxide ($Co_3O_4$) to be made to remain and be contained.

The firing time in the firing step is 1 to 30 hours and preferably 5 to 20 hours. The firing atmosphere in the firing step is an oxidative atmosphere such as air or oxygen gas.

The lithium cobalt-based composite oxide thus obtained may be subjected to firing steps of a plurality of times, as required.

The average particle diameter of the lithium cobalt-based composite oxide particle before the Ti-containing compound and the Mg-containing compound are adhered is, in the particle diameter (D50) at a cumulative volume of 50% in a particle size distribution determined by a laser diffraction scattering method, 0.5 to 30.0 μm, preferably 3.0 to 25.0 μm and especially preferably 7.0 to 25.0 μm. Then, the BET specific surface area of the lithium cobalt-based composite oxide particle before the Ti-containing compound and the Mg-containing compound are adhered is preferably 0.05 to 1.0 $m^2/g$ and especially preferably 0.15 to 0.60 $m^2/g$. Due to that the average particle diameter and the BET specific surface area of the lithium cobalt-based composite oxide particle before the Ti-containing compound and the Mg-containing compound are adhered are in the above ranges, the preparation and the coatability of a positive electrode mixture become easy, and further, an electrode high in the packing property can be obtained.

In the positive electrode active substance for a lithium secondary battery of the present invention, the lithium cobalt-based composite oxide particle constituting the positive electrode active substance for a lithium secondary battery is a lithium cobalt-based composite oxide particle having the Ti-containing compound and the Mg-containing compound adhered on at least part of the particle surface.

In the positive electrode active substance for a lithium secondary battery of the present invention, the Ti-containing compound may be adhered on part of the surface of the lithium cobalt-based composite oxide particle, or may be adhered so as to cover the entire of the surface of the lithium cobalt-based composite oxide particle. Then, in the positive electrode active substance for a lithium secondary battery of the present invention, the Mg-containing compound may be adhered on part of the surface of the lithium cobalt-based composite oxide particle, or may be adhered so as to cover the entire of the surface of the lithium cobalt-based composite oxide particle. In the positive electrode active substance for a lithium secondary battery of the present invention, due to that the Ti-containing compound and the Mg-containing compound are adhered on at least part of the surface of the lithium cobalt-based composite oxide particle, the deterioration of the cycle characteristics becomes little and the energy retention rate becomes high. Then, in the positive electrode active substance for a lithium secondary battery of the present invention, it is preferable that the Mg-containing compound is adhered so as to cover the entire of the surface of the lithium cobalt-based composite oxide particle and the titanium compound is adhered on part of the surface of the lithium cobalt-based composite oxide particle, or the Mg-containing compound is adhered on part of the surface of the lithium cobalt-based composite oxide particle and the titanium compound is adhered on part of the surface of the lithium cobalt-based composite oxide particle, from the viewpoint that in the lithium secondary battery, the positive electrode active substance becomes a positive electrode active substance little in the deterioration of the cycle characteristics and high in the energy density retention rate even in repetition of charge and discharge at high voltages.

In the positive electrode active substance for a lithium secondary battery of the present invention, the Mg-containing compound adhered on part of or the entire of the surface of the lithium cobalt-based composite oxide particle is a compound containing Mg, and examples of the Mg-containing compound include a sulfate salt of Mg, an oxide of Mg, a fluoride of Mg, and composite compounds of titanium and magnesium (hereinafter, described also as "composite oxide of Ti and Mg").

The oxide of Mg may be one produced by oxidatively decomposing an organic acid salt of Mg at 400 to 1,000° C., preferably 600 to 1,000° C. and especially preferably 750 to 1,000° C. As the organic acid salt of Mg, a carboxylate salt thereof is preferable; and examples of the carboxylate salt include salts of monocarboxylic acids such as formic acid, acetic acid, glycolic acid, lactic acid and gluconic acid, salts of dicarboxylic acids such as oxalic acid, maleic acid, malonic acid, malic acid, tartaric acid and succinic acid, and salts of carboxylic acids having three carboxyl groups, such as citric acid. Then, when an organic acid salt of Mg is used as a raw material to be adhered on the surface of the lithium cobalt-based composite oxide particle, since the positive electrode active substance for a lithium secondary battery of the present invention is one obtained by adhering the organic acid salt of Mg on the surface of the lithium cobalt-based composite oxide particle and thereafter heat-treating the resultant at 400 to 1,000° C., preferably 600 to 1,000° C. and especially preferably 750 to 1,000° C., the Mg-containing compound adhered on the surface of the lithium cobalt-based composite oxide particle is an oxidatively decomposed material of the organic acid salt of Mg.

As the Mg-containing compound, a sulfate salt of Mg, an oxide of Mg and composite oxides of Ti and Mg are preferable because of being high in stability even in a charged state and being capable of contributing to the improvement of the battery characteristics; and the sulfate salt of Mg is especially preferable because of also having the pH lowering effect on the lithium cobalt-based composite oxide.

In the positive electrode active substance for a lithium secondary battery of the present invention, the amount of the Mg-containing compound adhered is, in terms of atom, with respect to Co in the lithium cobalt-based composite oxide, as Mg, preferably 0.01 to 5.00% by mol and more preferably 0.10 to 2.00% by mol. Due to that the amount of the Mg-containing compound adhered is in the above range, there can simultaneously be satisfied both of the high charge and discharge capacities and the battery characteristics such as the cycle characteristics, the load characteristics and the safety.

The Ti-containing compound relevant to the positive electrode active substance for a lithium secondary battery of the present invention includes oxides containing Ti.

Examples of the oxides containing Ti include oxides of Ti, composite oxides of Ti and Li, composite oxides of Ti and an M element, composite oxides of Ti, an M element and Li, and composite oxides of Ti and Mg.

The oxides containing titanium may be ones produced by oxidatively decomposing organotitanium compounds at 400 to 1,000° C., preferably 600 to 1,000° C. and especially preferably 750 to 1,000° C. The organotitanium compounds include organic acid salts of Ti, and titanium chelate compounds. Then, when an organic acid salt of Ti or a titanium chelate compound is used as a raw material to be adhered as a Ti-containing compound on the surface of the lithium cobalt-based composite oxide particle, since the positive electrode active substance for a lithium secondary battery of the present invention is one obtained by adhering the organic acid salt of Ti or the titanium chelate compound on the surface of the lithium cobalt-based composite oxide particle and thereafter heat-treating the resultant at 400 to 1,000° C., preferably 600 to 1,000° C. and especially preferably 750 to 1,000° C., the Ti-containing compound adhered on the surface of the lithium cobalt-based composite oxide particle is an oxidatively decomposed material of the organic acid salt of Ti or the titanium chelate compound.

As the organic acid salt of titanium, a carboxylate salt thereof is preferable; and examples of the carboxylate salt include salts of monocarboxylic acids such as formic acid, acetic acid, glycolic acid, lactic acid and gluconic acid, salts of dicarboxylic acids such as oxalic acid, maleic acid, malonic acid, malic acid, tartaric acid and succinic acid, and salts of carboxylic acids having three carboxyl groups, such as citric acid.

The titanium chelate compound is a compound in which one or more molecules of hydroxycarboxylic acid coordinate to a titanium metal atom. As the titanium chelate compound, one represented by the following general formula (1) is preferable.

$$Ti(R^1)_m L_n \qquad (1)$$

wherein $R^1$ denotes an alkoxy group, a hydroxy group, a halogen atom, an amino group or a phosphine, and in the case of being present in plural numbers, may be identical or different; L denotes a group originated from a hydroxycarboxylic acid, and in the case of being present in plural numbers, may be identical or different; and m denotes the number of 0 or more and 3 or less, n denotes the number of 1 or more and 3 or less, and m+n is 3 to 6.

The alkoxy group represented by $R^1$ is preferably a straight-chain or branched-chain alkoxy group having 1 to 4 carbon atoms. The halogen atom includes a fluorine atom, a chlorine atom, a bromine atom and an iodine atom. Examples of the amino group include a methylamino group, an ethylamino group, a propylamino group, an isopropylamino group, a butylamino group, an isobutylamino group, a tert-butylamino group and a pentylamino group. Examples of the phosphine include trimethylphosphine, triethylphosphine, tributylphosphine, tris-tert-butylphosphine and triphenylphosphine.

The group originated from a hydroxycarboxylic acid represented by L includes groups originated from a hydroxycarboxylic acid whose oxygen atom of a hydroxyl group in the hydroxycarboxylic acid or oxygen atom of a carboxyl group in the hydroxycarboxylic acid coordinates to a titanium atom. The group also includes groups originated from a hydroxycarboxylic acid whose oxygen atom of a hydroxyl group in the hydroxycarboxylic acid and oxygen atom of a carboxyl group in the hydroxycarboxylic acid bidentately coordinate to a titanium atom. Among these, preferable are the groups originated from a hydroxycarboxylic acid whose oxygen atom of a hydroxyl group in a hydroxycarboxylic acid and oxygen atom of a carboxyl group in the hydroxycarboxylic acid bidentately coordinate to a titanium atom. In the case where m is 0, it is preferable that m+n is 3; and in the case where m is 1 or more and 3 or less, it is preferable that m+n is 4 or 5.

In the positive electrode active substance for a lithium secondary battery of the present invention, the oxide containing titanium as the Ti-containing compound is high in stability even in a charged state and can contribute to the improvement of the battery characteristics.

In the positive electrode active substance for a lithium secondary battery of the present invention, the amount of the Ti-containing compound adhered is, in terms of atom, with respect to Co in the lithium cobalt-based composite oxide, as Ti, preferably 0.01 to 5.00% by mol and more preferably 0.10 to 2.00% by mol. Due to that the amount of the Ti-containing compound adhered is in the above range, there can simultaneously be satisfied both of the high charge and discharge capacities and the battery characteristics such as the cycle characteristics, the load characteristics and the safety.

The average particle diameter of the positive electrode active substance for a lithium secondary battery of the present invention is, in the particle diameter (D50) at a cumulative volume of 50% in a particle size distribution determined by a laser diffraction scattering method, 0.5 to 30.0 µm, preferably 3.0 to 25.0 µm and especially preferably 7.0 to 25.0 µm. Then, the BET specific surface area of the positive electrode active substance for a lithium secondary battery of the present invention is preferably 0.05 to 1.0 m$^2$/g and especially preferably 0.15 to 0.60 m$^2$/g. Due to that the average particle diameter and the BET specific surface area of the positive electrode active substance for a lithium secondary battery of the present invention are in the above ranges, the preparation and the coatability of a positive electrode mixture become easy, and further, an electrode high in the packing property can be obtained.

The positive electrode active substance for a lithium secondary battery of the present invention may be one produced by any production method, but one produced by one of the following (a) to (c) is preferable from the viewpoint of being little in the deterioration of the cycle characteristics and high in the energy density retention rate even when the one produced is repeatedly charged and discharged at high voltages.

(a) A method in which a lithium cobalt-based composite oxide particle is brought into contact with a surface-treating liquid containing the Mg-containing compound or a precursor of the Mg-containing compound, wholly dried as it is for removing a solvent, and thereafter heat-treated (a1) at 400 to 1,000° C., preferably 600 to 1,000° C. and especially preferably 750 to 1,000° C. to thereby obtain a lithium cobalt-based composite oxide particle surface-treated with the Mg-containing compound; then, the lithium cobalt-based composite oxide particle surface-treated with the Mg-containing compound is brought into contact with a surface-treating liquid containing the Ti-containing compound or a precursor of the Ti-containing compound, wholly dried as it is for removing a solvent, and thereafter heat-treated (a2) at 400 to 1,000° C., preferably 600 to 1,000° C. and especially preferably 750 to 1,000° C. to thereby obtain the positive electrode active substance for a lithium secondary battery of the present invention.

(b) A method in which a lithium cobalt-based composite oxide particle is brought into contact with a surface-treating liquid containing the Ti-containing compound or a precursor of the Ti-containing compound, wholly dried as it is for removing a solvent, and thereafter heat-treated (b1) at 400 to 1,000° C., preferably 600 to 1,000° C. and especially preferably 750 to 1,000° C. to thereby obtain a lithium cobalt-based composite oxide particle surface-treated with the Ti-containing compound; then, the lithium cobalt-based composite oxide particle surface-treated with the Ti-containing compound is brought into contact with a surface-treating liquid containing the Mg-containing compound or a precursor of the Mg-containing compound, wholly dried as it is for removing a solvent, and thereafter heat-treated (b2) at 400 to 1,000° C., preferably 600 to 1,000° C. and especially preferably 750 to 1,000° C. to thereby obtain the positive electrode active substance for a lithium secondary battery of the present invention.

(c) A method in which a lithium cobalt-based composite oxide particle is brought into contact with a surface-treating liquid containing the Mg-containing compound or a precursor of the Mg-containing compound and the Ti-containing compound or a precursor of the Ti-containing compound, wholly dried as it is for removing a solvent, and thereafter heat-treated (c1) at 400 to 1,000° C., preferably 600 to 1,000° C. and especially preferably 750 to 1,000° C. to thereby obtain the positive electrode active substance for a lithium secondary battery of the present invention.

The lithium cobalt-based composite oxide particles used in the production methods of (a), (b) and (c) are the same as the lithium cobalt-based composite oxide particle before the Mg-containing compound and the Ti-containing compound are adhered relevant to the positive electrode active substance for a lithium secondary battery of the present invention.

The surface-treating liquid containing the Mg-containing compound or the precursor of the Mg-containing compound to be used in the production methods of (a) and (b) is a solution in which the Mg-containing compound or the precursor of the Mg-containing compound is dissolved or dispersed in water and/or an organic solvent.

The surface-treating liquid containing the Ti-containing compound or the precursor of the Ti-containing compound to be used in the production methods of (a) and (b) is a solution in which the Ti-containing compound or the precursor of the Ti-containing compound is dissolved or dispersed in water and/or an organic solvent.

The surface-treating liquid containing the Mg-containing compound or the precursor of the Mg-containing compound and the Ti-containing compound or the precursor of the Ti-containing compound is a solution in which the Mg-containing compound or the precursor of the Mg-containing compound and the Ti-containing compound or the precursor of the Ti-containing compound are dissolved or dispersed in water and/or an organic solvent.

Examples of the Mg-containing compound include a sulfate salt of Mg, an oxide of Mg, a fluoride of Mg, and composite compounds of Ti and Mg. The precursor of the Mg-containing compound includes organic acid salts of Mg. The precursor of the Mg-containing compound is thermally decomposed on the particle surface of the lithium cobalt-based composite oxide by heat treatment at 400 to 1,000° C., preferably 600 to 1,000° C. and especially preferably 750 to 1,000° C.

As the organic acid salt of Mg, a carboxylate salt thereof is preferable; and examples of the carboxylate salt include salts of monocarboxylic acids such as formic acid, acetic acid, glycolic acid, lactic acid and gluconic acid, salts of dicarboxylic acids such as oxalic acid, maleic acid, malonic acid, malic acid, tartaric acid and succinic acid, and salts of carboxylic acids having three carboxyl groups, such as citric acid. Then, these organic acids of Mg are converted to an oxide of Mg by heat treatment described later.

The Ti-containing compound includes oxides containing titanium. Examples of the oxides containing titanium include oxides of Ti, composite oxides of Ti and Li, composite oxides of Ti and an M element, composite oxides of Ti, an M element and Li, and composite oxides of Ti and Mg.

The precursor of the Ti-containing compound includes organotitanium compounds. The organotitanium compounds include organic acid salts of titanium, and titanium chelate compounds. The precursor of the Ti-containing compound is thermally decomposed on the particle surface of the lithium cobalt-based composite oxide by heat treatment at 400 to 1,000° C., preferably 600 to 1,000° C. and especially preferably 750 to 1,000° C. Then, the precursor of the Ti-containing compound is thermally decomposed on the particle surface of the lithium cobalt-based composite oxide by the heat treatment at 400 to 1,000° C., preferably 600 to 1,000° C. and especially preferably 750 to 1,000° C. to thereby make an oxide containing titanium.

As the organic acid salt of titanium, a carboxylate salt thereof is preferable; and examples of the carboxylate salt include salts of monocarboxylic acids such as formic acid, acetic acid, glycolic acid, lactic acid and gluconic acid, salts of dicarboxylic acids such as oxalic acid, maleic acid, malonic acid, malic acid, tartaric acid and succinic acid, and salts of carboxylic acids having three carboxyl groups, such as citric acid.

The titanium chelate compound is a compound in which one or more molecules of hydroxycarboxylic acid coordinate to a titanium metal atom. As the precursor of the Ti-containing compound, a titanium chelate compound represented by the following general formula (1) is preferable.

$$\mathrm{Ti}(R^1)_m L_n \quad (1)$$

wherein $R^1$ denotes an alkoxy group, a hydroxy group, a halogen atom, an amino group or a phosphine, and in the case of being present in plural numbers, may be identical or different; L denotes a group originated from a hydroxycarboxylic acid, and in the case of being present in plural numbers, may be identical or different; and m denotes the number of 0 or more and 3 or less, n denotes the number of 1 or more and 3 or less, and m+n is 3 to 6.

The alkoxy group represented by $R^1$ is preferably a straight-chain or branched-chain alkoxy group having 1 to 4 carbon atoms. The halogen atom includes a fluorine atom, a chlorine atom, a bromine atom and an iodine atom. Examples of the amino group include a methylamino group, an ethylamino group, a propylamino group, an isopropylamino group, a butylamino group, an isobutylamino group, a tert-butylamino group and a pentylamino group. Examples of the phosphine include trimethylphosphine, triethylphosphine, tributylphosphine, tris-tert-butylphosphine and triphenylphosphine.

The group originated from a hydroxycarboxylic acid represented by L includes groups originated from a hydroxycarboxylic acid whose oxygen atom of a hydroxyl group in the hydroxycarboxylic acid or oxygen atom of a carboxyl group in the hydroxycarboxylic acid coordinates to a titanium atom. The group also includes groups originated from a hydroxycarboxylic acid whose oxygen atom of a hydroxyl group in the hydroxycarboxylic acid and oxygen atom of a carboxyl group in the hydroxycarboxylic acid bidentately coordinate to a titanium atom. Among these, preferable are the groups originated from a hydroxycarboxylic acid whose oxygen atom of a hydroxyl group in a hydroxycarboxylic acid and oxygen atom of a carboxyl group in the hydroxycarboxylic acid bidentately coordinate to a titanium atom. In the case where m is 0, it is preferable that m+n is 3; and in the case where m is 1 or more and 3 or less, it is preferable that m+n is 4 or 5.

The titanium chelate compound is obtained as a solution containing the titanium chelate compound, for example, by diluting a titanium alkoxide with a solvent to obtain a diluted liquid, and mixing the diluted liquid with a hydroxycarboxylic acid (see WO2019/138989). In this production method, the solution containing the titanium chelate compound can be used as it is as the solution containing the organotitanium compound.

Alternatively, water may be added to the solution containing the titanium chelate compound. Thereby, there can be obtained a liquid in which the titanium chelate compound is dispersed or dissolved in a water-containing solvent.

Then, the titanium alkoxide includes tetramethoxytitanium (IV), tetraethoxytitanium (IV), tetra-n-propoxytitanium (IV), tetraisopropoxytitanium (IV), tetra-n-butoxytitanium (IV) and tetraisobutoxytitanium (IV).

Then, examples of the hydroxycarboxylic acid include monovalent carboxylic acids such as lactic acid, glycolic acid, glyceric acid and hydroxybutyric acid, divalent carboxylic acids such as tartronic acid, malic acid and tartaric acid, and trivalent carboxylic acids such as citric acid and isocitric acid. Among these, lactic acid is preferable from the viewpoint of easily becoming a solution at room temperature, being easily mixed with a diluted liquid of the titanium alkoxide, and enabling a titanium chelate compound to be easily produced.

As the solvent to be used as a diluting liquid, there can preferably be used an alcohol such as methanol, ethanol, isopropanol, n-propanol, n-butanol, sec-butanol, tert-butanol or n-pentane.

For the purpose of highly productively obtaining a titanium chelate compound, when the diluted liquid and the hydroxycarboxylic acid are mixed, or to the solution containing a titanium chelate compound, a ligand compound other than the hydroxycarboxylic acid capable of coordinating to titanium may be added. Examples of such a ligand compound include halogen atom-containing compounds, amines having a functional group such as a methylamino group, an ethylamino group, a propylamino group, an isopropylamino group, a butylamino group, an isobutylamino group, a t-butylamino group and a pentylamino group, and phosphines such as trimethylphosphine, triethylphosphine, tributylphosphine, tris-tert-butylphosphine and triphenyl phosphine.

Titanium chelate compounds are partially commercially available from Matsumoto Fine Chemical Co., Ltd., and commercially available products may be used.

In the surface-treating liquid containing the Mg-containing compound or the precursor of the Mg-containing compound to be used in the production methods of (a) and (b), it is preferable that the content of the Mg-containing compound or the precursor of the Mg-containing compound is, in terms of atom, as Mg, 0.01 to 30.0% by mass, preferably 0.05 to 25.0% by mass, from the viewpoint of the stability and the operability of the covering treatment of the Mg solution.

In the surface-treating liquid containing the Ti-containing compound or the precursor of the Ti-containing compound to be used in the production methods of (a) and (b), it is preferable that the content of the Ti-containing compound or the precursor of the Ti-containing compound is, in terms of atom, as Ti, 0.01 to 30.0% by mass, preferably 0.05 to 20.0% by mass, from the viewpoint of the stability and the operability of the covering treatment of the Ti solution.

In the surface-treating liquid containing the Mg-containing compound or the precursor of the Mg-containing compound and the Ti-containing compound or the precursor of the Ti-containing compound to be used in the production method of (c), it is preferable that the content of the Mg-containing compound or the precursor of the Mg-containing compound is, in terms of atom, as Mg, 0.01 to 30.0% by mass, preferably 0.05 to 25.0% by mass, from the viewpoint of the stability and the operability of the covering treatment of the solution; and it is preferable that the content of the Ti-containing compound or the precursor of the Ti-containing compound is, in terms of atom, as Ti, 0.01 to 30.0% by mass, preferably 0.05 to 20.0% by mass, from the viewpoint of the stability and the operability of the covering treatment of the solution.

In the production methods of (a) to (c), it is preferable that the proportion of the Mg-containing compound or the precursor of the Mg-containing compound and the Ti-containing compound or the precursor of the Ti-containing compound is, in a molar ratio (Ti/Mg) of Ti atoms of the Ti-containing compound or the precursor of the Ti-containing compound to the Mg-containing compound or the precursor of the Mg-containing compound, 0.01 to 5.00, preferably 0.01 to 2.00, from the viewpoint that the capacity retention rate and the energy density retention rate at high voltages become especially high.

The contacting of the lithium cobalt-based composite oxide particle with the surface-treating liquid containing the Mg-containing compound or the precursor of the Mg-containing compound, and the contacting of the lithium cobalt-based composite oxide particle surface-treated with the Mg-containing compound, with the surface-treating liquid containing the Ti-containing compound or the precursor of the Ti-containing compound, in the production method of (a); the contacting of the lithium cobalt-based composite oxide particle with the surface-treating liquid containing the Ti-containing compound or the precursor of the Ti-containing compound, and the contacting of the lithium cobalt-based composite oxide particle surface-treated with the Ti-containing compound, with the surface-treating liquid containing the Mg-containing compound or the precursor of the Mg-containing compound, in the production method of (b); and the contacting of the lithium cobalt-based composite oxide particle with the surface-treating liquid containing the Mg-containing compound or the precursor of the Mg-containing compound and the Ti-containing compound or the precursor of the Ti-containing compound, can be carried out, for example, by mixing the particle to be surface-treated such as the lithium cobalt-based composite oxide particle, the lithium cobalt-based composite oxide particle surface-treated with the Mg-containing compound or the lithium cobalt-based composite oxide particle surface-treated with the Ti-containing compound, with the predetermined surface-treating liquid. Then, a mixture obtained by mixing the particle to be surface-treated with the surface-treating liquid may be powdery, pasty or slurry. In the case where the mixture is powdery, pasty or slurry, the mixture of any form thereof can be obtained by suitably regulating the amount of the surface-treating liquid added to the particle to be surface-treated.

With regard to drying of the mixture after the particle to be surface-treated is brought into contact with the surface-treating liquid in the production methods of (a) to (c), whole drying of the mixture may be carried out by using a spray dryer, a rotary evaporator, a fluidized bed drying coater, a vibration dryer or the like. Then, in the case of carrying out the whole drying of the mixture, the amount of the Mg-containing compound and/or the Ti-containing compound adhered on the lithium cobalt-based composite oxide particle can be represented as a theoretical amount adhered determined from the Mg amount and the Ti amount in the surface-treating liquid used and the amount of the lithium cobalt-based composite oxide particle brought into contact with the surface-treating liquid.

In the production methods of (a) to (c), the particle to be surface-treated is brought into contact with the surface-treating liquid, dried and thereafter subjected to heat treatment at 400 to 1,000° C., preferably 600 to 1,000° C. and especially preferably 750 to 1,000° C. By carrying out the heat treatment, the Mg-containing compound in the surface-treating liquid is adhered firmly on the surface of the particle to be surface-treated; and the precursor of the Mg-containing compound is oxidatively decomposed and turns to the Mg-containing compound and is adhered firmly on the surface of the particle to be surface-treated. Then, the Ti-containing compound in the surface-treating liquid is adhered firmly on the surface of the particle to be surface-treated; and the precursor of the Ti-containing compound is oxidatively decomposed and turns to the Ti-containing compound and is adhered firmly on the surface of the particle to be surface-treated.

In the heat treatments ((a1), (a2), (b1) (b2) and (c1)) in the production methods of (a) to (c), the heat treatment temperature is 400 to 1,000° C., preferably 600 to 1,000° C. and especially preferably 750 to 1,000° C. When the heat treatment temperature is lower than the above range, in the case of containing the precursor of the Mg-containing compound or the precursor of the Ti-containing compound like the organic acid salt of Mg and the titanium chelate compound in the surface-treating liquid, sufficient decomposition and oxidative reaction are not carried out; on the other hand, when the heat treatment temperature exceeds the above range, there dominates the solid-solution reaction of Mg and Ti and the lithium cobalt-based composite oxide, and there lowers the adhering effect of the Ti-containing compound and the Mg-containing compound. The time for the heat treatment is not critical in the present production methods, and the positive electrode active substance for a lithium secondary battery having satisfactory performance can be obtained as long as the time is usually 1 hours or longer and preferably 2 to 10 hours. It is preferable that the atmosphere for the heat treatment is air, or an oxidative atmosphere such as oxygen gas.

By thus carrying out the production method of (a), (b) or (c), there is obtained the lithium cobalt-based composite oxide particle on at least part of the surface of which the Ti-containing compound and the Mg-containing compound are adhered.

Then, the positive electrode active substance for a lithium secondary battery of the present invention may be one obtained, in addition to the above production methods of (a) to (c), by the following production method (d) (hereinafter, described also as production method of (d)) of the positive electrode active substance for a lithium secondary battery of the present invention.

In the present invention, in particular, by using the positive electrode active substance for a lithium secondary battery obtained by the production method of (d), there can be obtained the positive electrode active substance high in the capacity retention rate and the energy density retention rate at high voltages.

The production method (d) of the positive electrode active substance for a lithium secondary battery of the present invention comprises subjecting a lithium cobalt-based composite oxide particle, an inorganic Mg-containing compound and an inorganic Ti-containing compound to a dry mixing treatment to thereby obtain a mixed material of the lithium cobalt-based composite oxide particle, the inorganic Mg-containing compound and the inorganic Ti-containing compound, and then subjecting the mixed material to a heat treatment (d1) at 400 to 1,000° C., preferably 600 to 1,000° C. and especially preferably 750 to 1,000° C. to thereby obtain the positive electrode active substance for a lithium secondary battery of the present invention.

The lithium cobalt-based composite oxide particle to be used in the production method of (d) is the same as the lithium cobalt-based composite oxide particle before the Mg-containing compound and the Ti-containing compound relevant to the above-mentioned positive electrode active substance for a lithium secondary battery of the present invention are adhered.

Examples of the inorganic Mg-containing compound relevant to the production method of (d) include an oxide of Mg, a hydroxide of Mg, a sulfate salt of Mg and a fluoride of Mg.

It is preferable that the average particle diameter of the inorganic Mg-containing compound as determined by a laser diffraction scattering method is 30.0 μm or smaller, preferably 0.01 to 10.0 μm, from the viewpoint that the Mg-containing compound can efficiently be adhered on the surface of the lithium cobalt-based composite oxide.

Then, the inorganic Mg-containing compound may be an aggregate forming a secondary particle formed by aggregation of primary particles. In the production method of (d), since the lithium cobalt-based composite oxide particle, the inorganic Mg-containing compound and the inorganic Ti-containing compound are subjected to the dry mixing treatment, the aggregated inorganic Mg-containing compound is disintegrated to primary particles during the mixing and the inorganic Mg-containing compound can be adhered on the particle surface of the lithium cobalt-based composite oxide.

In the case of using the aggregated inorganic Mg-containing compound, with regard to the primary particle diameter of the inorganic Mg-containing compound, it is preferable that the average particle diameter, as determined from a scanning electron microscope photograph, of primary particles of the inorganic Mg-containing compound is 2.0 μm or smaller, preferably 0.01 to 0.5 μm, from the viewpoint that the Mg-containing compound can efficiently be adhered on the surface of the lithium cobalt-based composite oxide.

Examples of the inorganic Ti-containing compound relevant to the production method of (d) include oxides of Ti.

It is preferable that the average particle diameter, as determined from a laser diffraction scattering method, of the inorganic Ti-containing compound is 30.0 μm or smaller, preferably 0.01 to 10.0 μm, from the viewpoint that the Ti-containing compound can efficiently be adhered on the surface of the lithium cobalt-based composite oxide.

Then, the inorganic Ti-containing compound may be an aggregate forming a secondary particle formed by aggregation of primary particles. In the production method of (d), since the lithium cobalt-based composite oxide particle, the inorganic Mg-containing compound and the inorganic Ti-containing compound are subjected to the dry mixing treatment, the aggregated inorganic Ti-containing compound is disintegrated to primary particles during the mixing and the inorganic Ti-containing compound can be adhered on the particle surface of the lithium cobalt-based composite oxide.

In the case of using the aggregated inorganic Ti-containing compound, with regard to the primary particle diameter of the inorganic Ti-containing compound, it is preferable that the average particle diameter, as determined from a scanning electron microscope photograph, of primary particles of the inorganic Ti-containing compound is made to be 2.0 μm or smaller, preferably 0.01 to 0.5 μm, from the viewpoint that the Ti-containing compound can efficiently be adhered on the surface of the lithium cobalt-based composite oxide.

In the production method of (d), it is preferable that the amount of the inorganic Mg-containing compound to be mixed in the lithium cobalt-based composite oxide is, in terms of atom, with respect to Co in the lithium cobalt-based composite oxide, as Mg, 0.01 to 5.00% by mol, preferably 0.10 to 2.00% by mol, from the viewpoint that both of the high charge and discharge capacities and the battery performance such as the cycle characteristics, the load characteristics and the safety can simultaneously be satisfied.

In the production method of (d), it is preferable that the amount of the inorganic Ti-containing compound to be mixed in the lithium cobalt-based composite oxide is, in terms of atom, with respect to Co in the lithium cobalt-based composite oxide, as Ti, 0.01 to 5.00% by mol, preferably 0.10 to 2.00% by mol, from the viewpoint that both of the high charge and discharge capacities and the battery performance such as the cycle characteristics, the load characteristics and the safety can simultaneously be satisfied.

In the production method of (d), it is preferable that the mixing proportion of the inorganic Mg-containing compound and the inorganic Ti-containing compound is, in a molar ratio (Ti/Mg) of Ti atoms in the inorganic Ti-containing compound to Mg atoms in the inorganic Mg-containing compound, 0.01 to 5.00, preferably 0.10 to 2.00, from the viewpoint that the capacity retention rate and the energy density retention rate at high voltages become especially high.

Then, the lithium cobalt-based composite oxide particle, the inorganic Mg-containing compound and the inorganic Ti-containing compound are subjected to the dry mixing treatment to thereby obtain the mixed material of the lithium cobalt-based composite oxide, the inorganic Mg-containing compound and the inorganic Ti-containing compound.

Examples of apparatuses used in the mixing treatment include a high-speed mixer, a Supermixer, a Turbo Sphere mixer, a Henschel mixer, a Nauta mixer, a ribbon blender and a V-type mixer. Here, means for this mixing operation is not limited to mechanical means exemplified. Then, as a mixing apparatus on a laboratory level, a household mixer and a laboratory mill suffice.

The mixed material of the lithium cobalt-based composite oxide particle, the inorganic Mg-containing compound and the inorganic Ti-containing compound, thus obtained, is one in which microparticles of the inorganic Mg-containing compound and microparticles of the inorganic Ti-containing compound, which are formed by being crushed into microparticles in the dry mixing, are adhered on the surface of the lithium cobalt-based composite oxide particle.

In the production method of (d), then, the mixed material of the lithium cobalt-based composite oxide particle, the inorganic Mg-containing compound and the inorganic Ti-containing compound is subjected to the heat treatment (d1) at 400 to 1,000° C., preferably 600 to 1,000° C. and especially preferably 750 to 1,000° C. By carrying out this heat treatment (d1), the inorganic Mg-containing compound and the inorganic Ti-containing compound can be adhered firmly on the surface of the lithium cobalt-based composite oxide particle to be surface-treated.

In the production method of (d), the time for the heat treatment is not critical, and the positive electrode active substance for a lithium secondary battery having satisfactory performance can be obtained as long as the time is usually 1 hours or longer and preferably 2 to 10 hours. It is preferable that the atmosphere for the heat treatment is air, or an oxidative atmosphere such as oxygen gas.

The lithium secondary battery of the present invention uses, as a positive electrode active substance, the positive electrode active substance for a lithium secondary battery of the present invention. The lithium secondary battery of the present invention is composed of a positive electrode, a negative electrode, a separator and a nonaqueous electrolyte containing a lithium salt.

The positive electrode relevant to the lithium secondary battery of the present invention is formed, for example, by applying and drying a positive electrode mixture on a positive electrode current collector. The positive electrode mixture is composed of the positive electrode active substance, a conductive agent, a binder and as required, a filler and the like to be added. In the lithium secondary battery of the present invention, the positive electrode has the positive electrode active substance for a lithium secondary battery of the present invention uniformly applied thereon. Hence, the lithium secondary battery of the present invention is high in the battery performance, and particularly even in repetition of charge and discharge at high voltages, is little in the deterioration of the (charge and discharge) capacities and high in the energy density retention rate.

The content of the positive electrode active substance contained in the positive electrode mixture relevant to the lithium secondary battery of the present invention is 70 to 100% by mass and preferably 90 to 98% by mass.

The positive electrode current collector relevant to the lithium secondary battery of the present invention is not especially limited as long as being an electron conductor causing no chemical change in a constituted battery, but examples thereof include stainless steels, nickel, aluminum, titanium, burned carbon, and aluminum and stainless steels whose surface has been surface treated with carbon, nickel, titanium or silver. These may be used by oxidizing the surface thereof, or may also be used by imparting roughness to the current collector surface by a surface treatment. Examples of the form of the current collector include foils, films, sheets, nets, punched materials, laths, porous materials, foams, and formed bodies of fibers or nonwoven fabrics. The thickness of the current collector is not especially limited, but is preferably made to be 1 to 500 µm.

The conductive agent relevant to the lithium secondary battery of the present invention is not especially limited as long as being an electron conducting material causing no chemical change in a constituted battery. Examples thereof include graphites such as natural graphite and artificial graphite, carbon blacks such as carbon black, acetylene black, Ketjen black, channel black, furnace black, lamp black and thermal black, conductive fibers such as carbon fibers and metal fibers, metal powders such as powders of carbon fluoride, aluminum, nickel or the like, conductive whiskers such as whiskers of zinc oxide, potassium titanate or the like, conductive metal oxides such as titanium oxide, and conductive materials such as polyphenylene derivatives; examples of the natural graphite include vein graphite, flake graphite and amorphous graphite. These can be used singly or in a combination of two or more. The blend ratio of the conductive agent is, in the positive electrode mixture, 1 to 50% by mass and preferably 2 to 30% by mass.

Examples of the binder relevant to the lithium secondary battery of the present invention include starch, polyvinylidene fluoride, polyvinyl alcohol, carboxymethylcellulose, hydroxypropylcellulose, regenerated cellulose, diacetylcellulose, polyvinylpyrrolidone, tetrafluoroethylene, polyethylene, polypropylene, ethylene-propylene diene terpolymer (EPDM), sulfonated EPDM, styrene butadiene rubber, fluororubber, tetrafluoroethylene-hexafluoroethylene copolymers, tetrafluoroethylene-hexafluoropropylene copolymers, tetrafluoroethylene-perfluoroalkyl vinyl ether copolymers, vinylidene fluoride-hexafluoropropylene copolymers, vinylidene fluoride-chlorotrifluoroethylene copolymers, ethylene-tetrafluoroethylene copolymers, polychlorotrifluoroethylene, vinylidene fluoride-pentafluoropropylene copolymers, propylene-tetrafluoroethylene copolymers, ethylene-chlorotrifluoroethylene copolymers, vinylidene fluoride-hexafluoropropylene-tetrafluoroethylene copolymers, vinylidene fluoride-perfluoromethyl vinyl ether-tetrafluoroethylene copolymers, ethylene-acrylic acid copolymers or ($Na^+$) ion-crosslinked materials thereof, ethylene-methacrylic acid copolymers or ($Na^+$) ion-crosslinked materials thereof, ethylene-methyl acrylate copolymers or ($Na^+$) ion-crosslinked materials thereof, ethylene-methyl methacrylate copolymers or ($Na^+$) ion-crosslinked materials thereof, polysaccharides of polyethylene oxide or the like, thermoplastic resins, and polymers having rubber elasticity; and these can be used singly or in a combination of two or more. Here, when a compound is used which contains a functional group reactive with lithium, like polysaccharides, it is preferable that a compound having, for example, an isocyanate group is added to deactivate the functional group. The blend ratio of the binder is, in the positive electrode mixture, 1 to 50% by mass and preferably 5 to 15% by mass.

The filler relevant to the lithium secondary battery of the present invention is a material to suppress the volume expansion and the like of the electrode in the positive electrode mixture, and is added as required. As the filler, any filler can be used as long as being a fibrous material causing no chemical change in a constituted battery, but fibers, for example, fibers of olefinic polymers such as polypropylene and polyethylene, glass, and carbon are used. The amount of the filler to be added is not especially limited, but is preferably 0 to 30% by mass in the positive electrode mixture.

The negative electrode relevant to the lithium secondary battery of the present invention is formed by applying and drying a negative electrode material on a negative electrode current collector. The negative electrode current collector relevant to the lithium secondary battery of the present invention is not especially limited as long as being an electron conductor causing no chemical change in a constituted battery, but examples thereof include stainless steels, nickel, copper, titanium, aluminum, burned carbon, and copper and stainless steels whose surface has been surface treated with carbon, nickel, titanium or silver, and aluminum-cadmium alloys. These may be used by oxidizing the surface thereof, or may also be used by imparting roughness to the current collector surface by a surface treatment. Examples of the form of the current collector include foils, films, sheets, nets, punched materials, laths, porous materials, foams, and formed bodies of fibers or nonwoven fabrics. The thickness of the current collector is not especially limited, but is preferably made to be 1 to 500 µm.

The negative electrode material relevant to the lithium secondary battery of the present invention is not especially limited, but examples thereof include carbonaceous materials, metal composite oxides, lithium metal, lithium alloys, silicon-based alloys, tin-based alloys, metal oxides, conductive polymers, chalcogen compounds, Li—Co—Ni-based alloys, $Li_4Ti_5O_{12}$, lithium niobate, and silicon oxide ($SiO_x$: $0.5 \leq x \leq 1.6$). Examples of the carbonaceous materials include non-graphitizable carbon materials and graphite-based carbon materials. Examples of the metal composite oxides include compounds such as $Sn_p(M^1)_{1-p}(M^2)_qO_r$ (wherein $M^1$ is one or more elements selected from Mn, Fe, Pb and Ge; $M^2$ is one or more elements selected from Al, B, P, Si, periodic table group 1, group 2 and group 3 elements and halogen elements; and $0<p\leq1$, $1\leq q\leq3$ and $1\leq r\leq8$), $Li_tFe_2O_3$ ($0\leq t\leq1$) and $Li_tWO_2$ ($0\leq t\leq1$). The metal oxides include GeO, $GeO_2$, SnO, $SnO_2$, PbO, $PbO_2$, $Pb_2O_3$, $Pb_3O_4$, $Sb_2O_3$, $Sb_2O_4$, $Sb_2O_5$, $Bi_2O_3$, $Bi_2O_4$ and $Bi_2O_5$. The conductive polymers include polyacetylene and poly-p-phenylene.

As the separator relevant to the lithium secondary battery of the present invention, there is used an insulating thin film having a high ion permeability and having a predetermined mechanical strength. There is used a sheet or a nonwoven fabric composed of an olefinic polymer such as polypropylene, or glass fibers, or polyethylene, or the like from the viewpoint of the organic solvent resistance and the hydrophobicity. The pore diameter of the separator suffices if being in the range useful as pores for batteries, and is, for example, 0.01 to 10 μm. The thickness of the separator suffices if being in the range for usual batteries, and is, for example, 5 to 300 μm. Then, in the case where a solid electrolyte such as a polymer is used as an electrolyte described later, the solid electrolyte may serve also as a separator.

The nonaqueous electrolyte containing a lithium salt relevant to the lithium secondary battery of the present invention is composed of a nonaqueous electrolyte and the lithium salt. As the nonaqueous electrolyte relevant to the present invention, a nonaqueous electrolyte solution, an organic solid electrolyte or an inorganic solid electrolyte is used. Examples of the nonaqueous electrolyte solution include one of or mixed solvents of two or more of aprotic organic solvents such as N-methyl-2-pyrroridinone, propylene carbonate, ethylene carbonate, butylene carbonate, dimethyl carbonate, diethyl carbonate, γ-butyrolactone, 1,2-dimethoxyethane, tetrahydroxyfuran, 2-methyltetrahydrofuran, dimethyl sulfoxide, 1,3-dioxolane, formamide, dimethylformamide, dioxolane, acetonitrile, nitromethane, methyl formate, methyl acetate, phosphate triesters, trimetoxymethane, dioxolane derivatives, sulfolane, methyl sulfolane, 3-methyl-2-oxazolidinone, 1,3-dimethyl-2-imidazolidinone, propylene carbonate derivatives, tetrahydrofuran derivatives, diethyl ether, 1,3-propanesultone, methyl propionate and ethyl propionate.

Examples of the organic solid electrolyte relevant to the lithium secondary battery of the present invention include: polymers containing ionic dissociation groups of polyethylene derivatives, polyethylene oxide derivatives or polymers containing these, polypropylene oxide derivatives or polymers containing these, phosphate ester polymers, polyphosphazene, polyaziridine, polyethylene sulfide, polyvinyl alcohol, polyvinylidene fluoride, polyhexafluoropropylene, and the like; and mixtures of the polymer containing ionic dissociation groups and the above-mentioned nonaqueous electrolyte solution.

As the inorganic solid electrolyte relevant to the lithium secondary battery of the present invention, there can be used a nitride, a halide, an oxygen acid salt, a sulfide or the like of Li; and examples thereof include $Li_3N$, $LiI$, $Li_5NI_2$, $Li_3N-LiI-LiOH$, $LiSiO_4$, $LiSiO_4-LiI-LiOH$, $Li_2SiS_3$, $Li_4SiO_4$, $Li_4SiO_4-LiI-LiOH$, $P_2S_5$, $Li_2S$ or $Li_2S-P_2S_5$, $Li_2S-SiS_2$, $Li_2S-GeS_2$, $Li_2S-Ga_2S_3$, $Li_2S-B_2S_3$, $Li_2S-P_2S_5-X$, $Li_2S-SiS_2-X$, $Li_2S-GeS_2-X$, $Li_2S-Ga_2S_3-X$, $Li_2S-B_2S_3-X$, (wherein X is at least one or more selected from $LiI$, $B_2S_3$ and $Al_2S_3$)

Further when the inorganic solid electrolyte is an amorphous material (glass), the inorganic solid electrolyte can be made to contain a compound containing oxygen, such as Lithium phosphate ($Li_3PO_4$), lithium oxide ($Li_2O$), lithium sulfate ($Li_2SO_4$), phosphorus oxide ($P_2O_5$) or lithium borate ($Li_3BO_3$), or a compound containing nitrogen, such as $Li_3PO_{4-u}N_{2u/3}$ (u is 0<u<4), $Li_4SiO_{4-u}N_{2u/3}$ (u is 0<u<4), $Li_4GeO_{4-u}N_{2u/3}$ (u is 0<u<4) or $Li_3BO_{3-u}N_{2u/3}$ (u is 0<u<3). The addition of the compound containing oxygen or the compound containing nitrogen leads to expansion of interstices in an amorphous skeleton formed, whereby the hindrance to lithium ion migration can be reduced, and further the ionic conductivity can be improved.

As the lithium salt relevant to the lithium secondary battery of the present invention, those dissolving in the above nonaqueous electrolyte are used, and examples thereof include one of or mixed salts of two or more of $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiB_{10}Cl_{10}$, $LiAlCl_4$, $CH_3SO_3Li$, $CF_3SO_3Li$, $(CF_3SO_2)_2NLi$, chloroborane lithium, lithium lower aliphatic carboxylates, lithium tetraphenylborate, and imides.

Then, to the nonaqueous electrolyte, compounds indicated below can be added for the purpose of improving charge and discharge characteristics and the flame retardancy. Examples thereof include pyridine, triethyl phosphite, triethanolamine, cyclic ethers, ethylenediamine, n-glyme, triamide hexaphosphate, nitrobenzene derivatives, sulfur, quinoneimine dyes, N-substituted oxazolidinone, N,N-substituted imidazolidine, ethylene glycol dialkyl ethers, ammonium salts, polyethylene glycol, pyrrole, 2-methoxyethanol, aluminum trichloride, monomers of conductive polymeric electrode active substances, triethylene phosphonamide, trialkyl phosphines, morpholine, aryl compounds having a carbonyl group, hexamethylphosphoric triamide, 4-alkylmorpholines, dicyclic tertiary amines, oils, phosphonium salts, tertiary sulfonium salts, phosphazene and carbonate esters. Further in order to make the electrolyte solution to be nonflammable, the electrolyte solution can be made to contain a halogen-containing solvent, for example, carbon tetrachloride or ethylene trifluoride. Further in order to make the electrolyte solution to have suitability for high-temperature storage, the electrolyte solution can be made to contain carbon dioxide gas.

The lithium secondary battery of the present invention is a lithium secondary battery little in the deterioration of the cycle characteristics and high in the energy density retention rate particularly even in repetition of charge and discharge at high voltages; and the shape of the battery may be any of a button shape, a sheet shape, a cylinder shape, a square shape, a coin shape and the like.

Applications of the lithium secondary battery of the present invention are not especially limited, but examples thereof include electronic devices such as notebook personal computers, laptop personal computers, pocket word processors, mobile phones, cordless slave units, portable CD players, radios, liquid crystal televisions, backup power sources, electric shavers, memory cards and video movies, and consumer electronic devices for automobiles, motorized vehicles, drones, game machines, electric power tools and the like.

EXAMPLES

Hereinafter, the present invention will be described in more detail by way of Examples, but the present invention is not any more limited to these Examples.

<Preparation of Lithium Cobalt-Based Composite Oxide Particle (LCO) Samples>

<LCO Sample 1>

Lithium carbonate (average particle diameter: 5.7 μm), tricobalt tetraoxide (average particle diameter: 2.5 μm), titanium dioxide (average particle diameter: 0.4 μm) and calcium sulfate (average particle diameter: 7.3 μm) were weighed and fully mixed by a household mixer to thereby obtain a raw material mixture in which the molar ratio of Li/Co was 1.04; Ti/Co, 0.01; and Ca/Co, 0.0006.

Then, the obtained raw material mixture was fired at 1,050° C. for 5 hours in the air in an alumina bowl. After the finish of the firing, the fired product was crushed and classified to thereby obtain a lithium cobalt-based composite oxide particle containing 1.00% by mol of Ti and 0.06% by mol of Ca with respect to Co.

<LCO Sample 2>

Lithium carbonate (average particle diameter: 5.7 μm), tricobalt tetraoxide (average particle diameter: 2.5 μm), further magnesium fluoride (average particle diameter: 2.8 μm), magnesium oxide (average particle diameter: 0.6 μm) and calcium sulfate (average particle diameter: 7.3 μm) were weighed and fully mixed by a household mixer to thereby obtain a raw material mixture in which the molar ratio of Li/Co was 1.05; the molar ratio of F/Co was 0.005; the molar ratio of Mg/Co was 0.005; and the molar ratio of Ca/Co was 0.0013.

Then, the obtained raw material mixture was fired at 1,080° C. for 5 hours in the air in an alumina bowl. After the finish of the firing, the fired product was crushed and classified to thereby obtain a lithium cobalt-based composite oxide particle containing 0.50% by mol of Mg and 0.13% by mol of Ca with respect to Co.

Physical properties of the lithium cobalt-based composite oxide samples (LCO samples) obtained in the above are shown in Table 1. Here, the average particle diameter was determined by a laser diffraction scattering method.

TABLE 1

| LCO Sample | Li/Co Feeding Ratio | % by mol of Elements added to Co | Average Particle Diameter (μm) | BET Specific Surface Area (m²/g) |
|---|---|---|---|---|
| Sample 1 | 1.04 | Ti: 1.00 Ca: 0.06 | 8.5 | 0.44 |
| Sample 2 | 1.05 | Mg: 0.50 Ca: 0.13 | 17.9 | 0.19 |

<Preparation of Surface-Treating Liquids>
<Preparation of Magnesium Sulfate-Containing Surface-Treating Liquids>

Magnesium sulfate was dissolved in water; and the pH was regulated so as to become 8.5 with ammonia water to thereby fabricate magnesium sulfate-containing surface-treating liquids having concentrations indicated in the following Table 2.

<Preparation of Lactic Acid Titanium Chelate-Containing Surface-Treating Liquids>

Tetraisopropoxytitanium (TPT) was added to isopropanol (IPA); lactic acid was added (in terms of molar ratio, TPT/IPA/lactic acid=1/2/3) under stirring; thereafter, water was added to thereby prepare lactic acid titanium chelate liquids. The pH was further regulated so as to become 8.5 with ammonia water to thereby fabricate lactic acid titanium chelate-containing surface-treating liquids having concentrations indicated in the following Table 2.

Then, the lactic acid titanium chelate contained mainly a compound in which m=0 and n=3 in the general formula (1), and L was a group whose oxygen atom of the hydroxyl group and oxygen atom of the carboxyl group in lactic acid bidentately coordinated to a titanium atom.

TABLE 2

| Surface-Treating Liquid | Main Component | Concentration of Mg Contained (mol/L) | Concentration of Ti Contained (mol/L) |
|---|---|---|---|
| A-1 | magnesium sulfate | 0.51 | — |
| A-2 | | 0.34 | — |
| B-1 | lactic acid | — | 0.51 |

TABLE 2-continued

| Surface-Treating Liquid | Main Component | Concentration of Mg Contained (mol/L) | Concentration of Ti Contained (mol/L) |
|---|---|---|---|
| B-2 | titanium chelate | — | 0.34 |

Example 1

30 g of the LCO sample 1 described in Table 1 was taken in a conical beaker; and 6 g of the magnesium sulfate-containing surface-treating liquid A-1 was added thereto and fully kneaded with a spatula or the like to thereby obtain a pasty mixture, which was then wholly dried by a drier at 100° C.; further, the obtained dry powder was subjected to heat treatment of firing at 800° C. for 5 hours to thereby obtain a magnesium sulfate-adhered LCO.

Then, the whole amount of the obtained magnesium sulfate-adhered LCO was transferred to a conical beaker; and 6 g of the lactic acid titanium chelate-containing surface-treating liquid B-1 was added thereto and fully kneaded with a spatula or the like to thereby obtain a pasty mixture, which was then wholly dried by a drier at 100° C.; further, the obtained dry powder was subjected to heat treatment of firing at 800° C. for 5 hours to thereby obtain a positive electrode active substance sample having an Mg-containing compound and a Ti-containing compound adhered in amounts of magnesium and titanium adhered indicated in Table 3.

Then, mapping of Ti atoms on the particle surface was carried out by SEM-EDX analysis of the obtained positive electrode active substance sample, and it was confirmed that Ti was present on part of the particle surface of the LCO sample 1.

Comparative Example 1

The LCO samples 1 described in Table 1 were subjected, as it were, to heat treatment of firing at 800° C. for 5 hours to thereby obtain a positive electrode active substance sample shown in Table 3.

Comparative Example 2

30 g of the LCO sample 1 described in Table 1 was taken in a conical beaker; and 6 g of the lactic acid titanium chelate-containing surface-treating liquid B-1 was added thereto and fully kneaded with a spatula or the like to thereby obtain a pasty mixture, which was then wholly dried by a drier at 100° C.; further, the obtained dry powder was subjected to heat treatment of firing at 800° C. for 5 hours to thereby obtain a positive electrode active substance sample having a Ti-containing compound adhered in an amount of titanium adhered indicated in Table 3.

Then, mapping of Ti atoms on the particle surface was carried out by SEM-EDX analysis of the obtained positive electrode active substance sample, and it was confirmed that Ti was present on part of the particle surface of the LCO sample 1.

Example 2

There was obtained by the same operation as in Example 1, a positive electrode active substance sample having an Mg-containing compound and a Ti-containing compound adhered in amounts of magnesium and titanium adhered indicated in Table 3, except for that the LCO sample 2 described in Table 1 was used; A-2 as a magnesium sulfate-containing surface-treating liquid and B-2 as a lactic acid titanium chelate-containing surface-treating liquid were used; the sample 2 was brought into contact with the surface-treating liquids; and thereafter the resultant was wholly dried to obtain a dry powder, and the dry powder was subjected to heat treatment of firing at 1,000° C. for 5 hours.

Then, mapping of Ti atoms on the particle surface was carried out by SEM-EDX analysis of the obtained positive electrode active substance sample, and it was confirmed that Ti was present on part of the particle surface of the LCO sample 2.

Comparative Example 3

The LCO sample 2 described in Table 1 was subjected, as it was, to heat treatment of firing at 1,000° C. for 5 hours to thereby obtain a positive electrode active substance sample shown in Table 3.

Comparative Example 4

30 g of the LCO sample 2 described in Table 1 was taken in a conical beaker; and 6 g of the lactic acid titanium chelate-containing surface-treating liquid B-2 was added thereto and fully kneaded with a spatula or the like to thereby obtain a pasty mixture, which was then wholly dried by a drier at 100° C.; further, the obtained dry powder was subjected to heat treatment of firing at 1,000° C. for 5 hours to thereby obtain a positive electrode active substance sample having a Ti-containing compound adhered in an amount of titanium adhered indicated in Table 3.

Then, mapping of Ti atoms on the particle surface was carried out by SEM-EDX analysis of the obtained positive electrode active substance sample, and it was confirmed that Ti was present on part of the particle surface of the LCO sample 2.

TABLE 3

| | LCO Sample | Treating Liquid | Amount Adhered (% by mol) | Firing Temperature (Heat Treatment Temperature) |
|---|---|---|---|---|
| Example 1 | Sample 1 | A-1<br>B-1 | Mg: 1.00<br>Ti: 1.00 | 800° C. |
| Comparative Example 1 | Sample 1 | — | — | 800° C. |
| Comparative Example 2 | Sample 1 | B-1 | Ti: 1.00 | 800° C. |
| Example 2 | Sample 2 | A-2<br>B-2 | Mg: 0.67<br>Ti: 0.67 | 1000° C. |
| Comparative Example 3 | Sample 2 | — | — | 1000° C. |
| Comparative Example 4 | Sample 2 | B-2 | Ti: 0.67 | 1000° C. |

Note)
The amount adhered is an amount in % by mol in terms of atom of Mg and/or Ti to Co in LCO sample.

Then, battery performance tests were carried out as follows.

<Fabrication of Lithium Secondary Batteries>

95% by mass of the positive electrode active substance obtained in Examples and Comparative Examples each, 2.5% by mass of a graphite powder and 2.5% by mass of a polyvinylidene fluoride were mixed to make a positive electrode mixture, and the mixture was dispersed in N-methyl-2-pyrrolidinone to thereby prepare a kneaded paste. The kneaded paste was applied on an aluminum foil, thereafter dried and pressed and punched out into a disc of 15 mm in diameter to thereby obtain a positive electrode plate.

By using the positive electrode plate, each member of a separator, a negative electrode, a positive electrode, current collectors, mounting metal fittings, external terminals, an electrolyte solution and the like was used to thereby fabricate a coin-type lithium secondary battery. Among these, the negative electrode used was a metal lithium foil, and the electrolyte solution used was one in which 1 mol of $LiPF_6$ was dissolved in 1 L of a mixed solution of ethylene carbonate and methyl ethyl carbonate in 1:1.

Then, performance evaluations for the obtained lithium secondary batteries were carried out. The results are shown in Table 4.

<Performance Evaluations of the Batteries>

The fabricated coin-type lithium secondary batteries were each operated at room temperature under the following test conditions and the following battery performance was evaluated.

(1-a) Test condition for evaluation of 4.5 V-cycle characteristics

On the lithium secondary batteries using the positive electrode active substance samples obtained in Example 1 and Comparative Examples 1 and 2, the following test was carried out.

First, on the battery, there was carried out constant current-constant voltage charge (CCCV charge) in which charge at 0.5C up to 4.5 V was carried out over 2 hours and the voltage of 4.5 V was held for 3 hours. Thereafter, constant current discharge (CC discharge) at 0.2C down to 2.7 V was carried out. The operation of these charge and discharge was taken as one cycle, and the discharge capacity was measured at every one cycle. This cycle was repeated 20 times.

Figure 2:
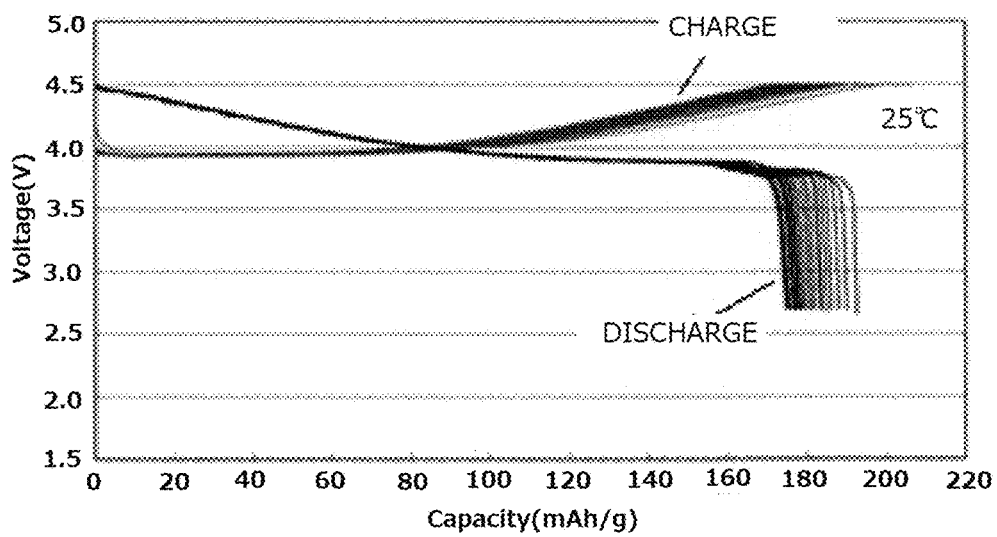
FIG. 2 is a diagram of charge and discharge characteristics of a lithium secondary battery using a positive electrode active substance sample obtained in Comparative Example 1.
Figure 3:
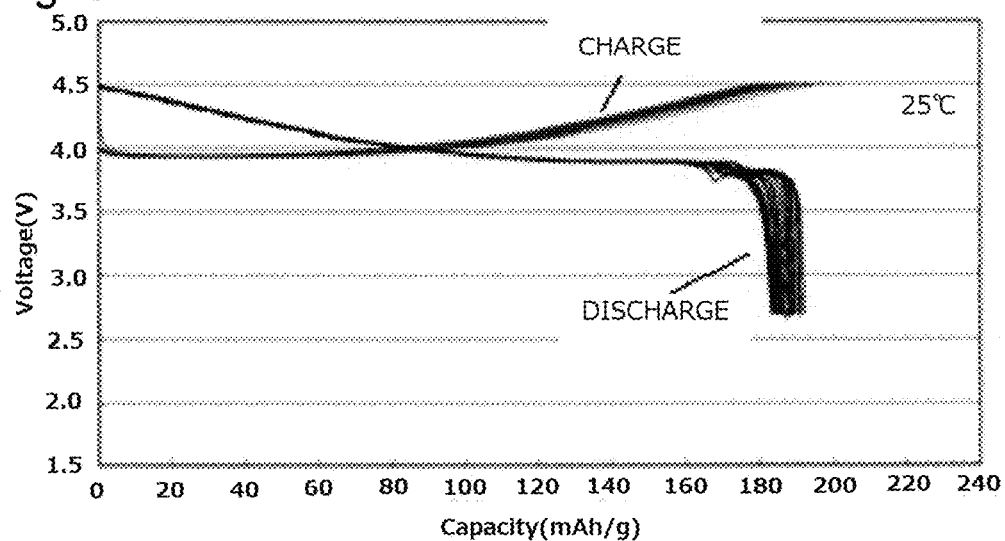
FIG. 3 is a diagram of charge and discharge characteristics of a lithium secondary battery using a positive electrode active substance sample obtained in Comparative Example 2.

There are shown in FIGS. 1 to 3, respectively, diagrams of charge and discharge characteristics of the lithium secondary batteries using the positive electrode active substance samples obtained in Example 1 and Comparative Examples 1 and 2.

(1-b) Test condition for evaluation of 4.6 V-cycle characteristics

On the lithium secondary batteries using the positive electrode active substance samples obtained in Example 2 and Comparative Examples 3 and 4, the following test was carried out.

First, on the battery, there was carried out constant current-constant voltage charge (CCCV charge) in which charge at 0.5C up to 4.6 V was carried out over 2 hours and the voltage of 4.6 V was held for 3 hours. Thereafter, constant current discharge (CC discharge) at 0.2C down to 2.7 V was carried out. The operation of these charge and discharge was taken as one cycle, and the discharge capacity was measured at every one cycle. This cycle was repeated 20 times.

Figure 4:
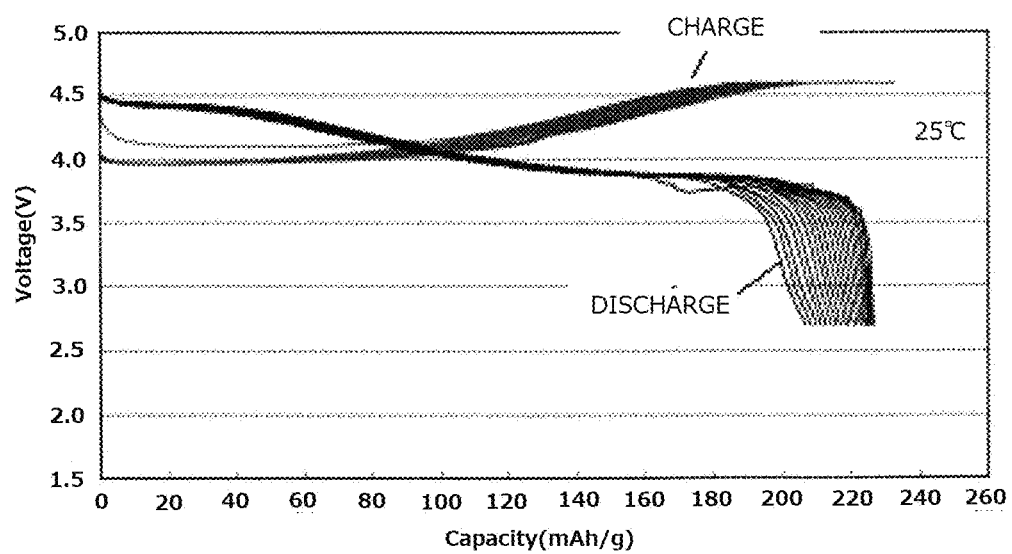
FIG. 4 is a diagram of charge and discharge characteristics of a lithium secondary battery using a positive electrode active substance sample obtained in Example 2.
Figure 5:
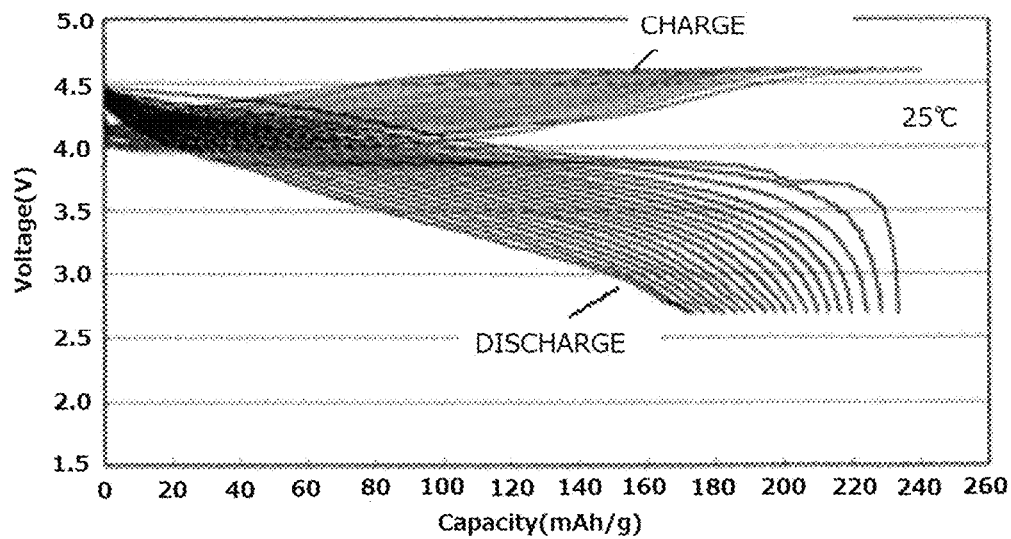
FIG. 5 is a diagram of charge and discharge characteristics of a lithium secondary battery using a positive electrode active substance sample obtained in Comparative Example 3.
Figure 6:
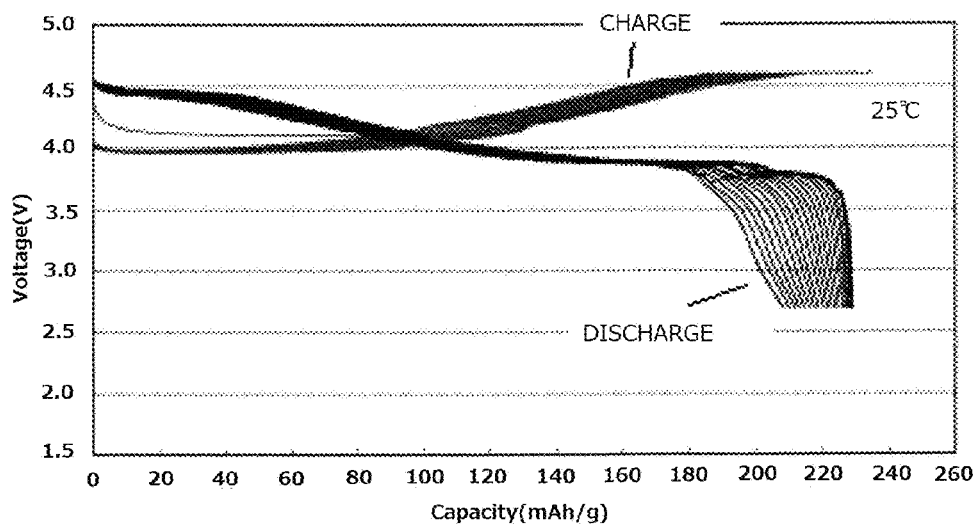
FIG. 6 is a diagram of charge and discharge characteristics of a lithium secondary battery using a positive electrode active substance sample obtained in Comparative Example 4.

There are shown in FIGS. 4 to 6, respectively, diagrams of charge and discharge characteristics of the lithium secondary batteries using the positive electrode active substance samples obtained in Example 2 and Comparative Examples 3 and 4.

(2) First-cycle capacity (per active substance weight), and first-cycle charge and discharge efficiency The charge capacity and the discharge capacity of the first cycle in the evaluation of the cycle characteristics were taken as a first-cycle charge capacity and a first-cycle discharge capacity, respectively, and the efficiency calculated by the following expression was taken as a first-cycle charge and discharge efficiency.

First-cycle charge and discharge efficiency (%)=(a charge capacity of the first cycle/a discharge capacity of the first cycle)×100

(3) Capacity retention rate

The capacity retention rate was calculated by the following expression from the respective discharge capacities (per active substance weight) of the first cycle and the 20th cycle in the evaluation of the cycle characteristics.

Capacity retention rate (%)=(a discharge capacity the 20th cycle/a discharge capacity of the first cycle)×100

(4) Energy density retention rate

The energy density retention rate was calculated by the following expression from the respective Wh capacities (per active substance weight) in discharge of the first cycle and the 20th cycle in the evaluation of the cycle characteristics.

Energy density retention rate (%)=(a discharge Wh capacity of the 20th cycle/a discharge Wh capacity of the first cycle)×100

TABLE 4

|  | Charge Voltage (V) | First-Cycle Charge Capacity (mAh/g) | First-Cycle Discharge Capacity (mAh/g) | First-Cycle Charge and Discharge Efficiency (%) | Capacity Retention Rate (%) | Energy Density Retention Rate (%) |
|---|---|---|---|---|---|---|
| Example 1 | 4.5 | 194 | 188 | 97.0 | 97.6 | 97.7 |
| Comparative Example 1 | 4.5 | 206 | 194 | 94.5 | 90.9 | 91.0 |
| Comparative Example 2 | 4.5 | 202 | 194 | 96.1 | 95.5 | 95.4 |

TABLE 5

|  | Charge Voltage (V) | First-Cycle Charge Capacity (mAh/g) | First-Cycle Discharge Capacity (mAh/g) | First-Cycle Charge and Discharge Efficiency (%) | Capacity Retention Rate (%) | Energy Density Retention Rate (%) |
|---|---|---|---|---|---|---|
| Example 2 | 4.6 | 232 | 227 | 97.5 | 91.2 | 90.4 |
| Comparative Example 3 | 4.6 | 240 | 234 | 97.4 | 73.6 | 63.3 |
| Comparative Example 4 | 4.6 | 234 | 229 | 97.7 | 90.9 | 89.1 |

<Preparation of a Lithium Cobalt-Based Composite Oxide Particle (LCO) Sample>

<LCO Sample 3>

Lithium carbonate (average particle diameter: 5.7 μm) and tricobalt tetraoxide (average particle diameter: 2.5 μm) were weighed and fully mixed by a laboratory mill to thereby obtain a raw material mixture in which the molar ratio of Li/Co was 0.997.

Then, the obtained raw material mixture was fired at 1,070° C. for 5 hours in the air in an alumina bowl. After the finish of the firing, the fired product was crushed and classified to thereby obtain a lithium cobalt-based composite oxide particle in the following Table 6.

The obtained lithium cobalt-based composite oxide particle was X-ray diffractometrically analyzed using a CuKα line as a line source, and the result was that the ratio ((A/B)×100) of the intensity (A) of the diffraction peak in the region of 2θ=36.8° caused by $Co_3O_4$ to the intensity (B) of the diffraction peak in the region of 2θ=37.4° caused by $LiCoO_2$ was 1.9%.

Figure 7:
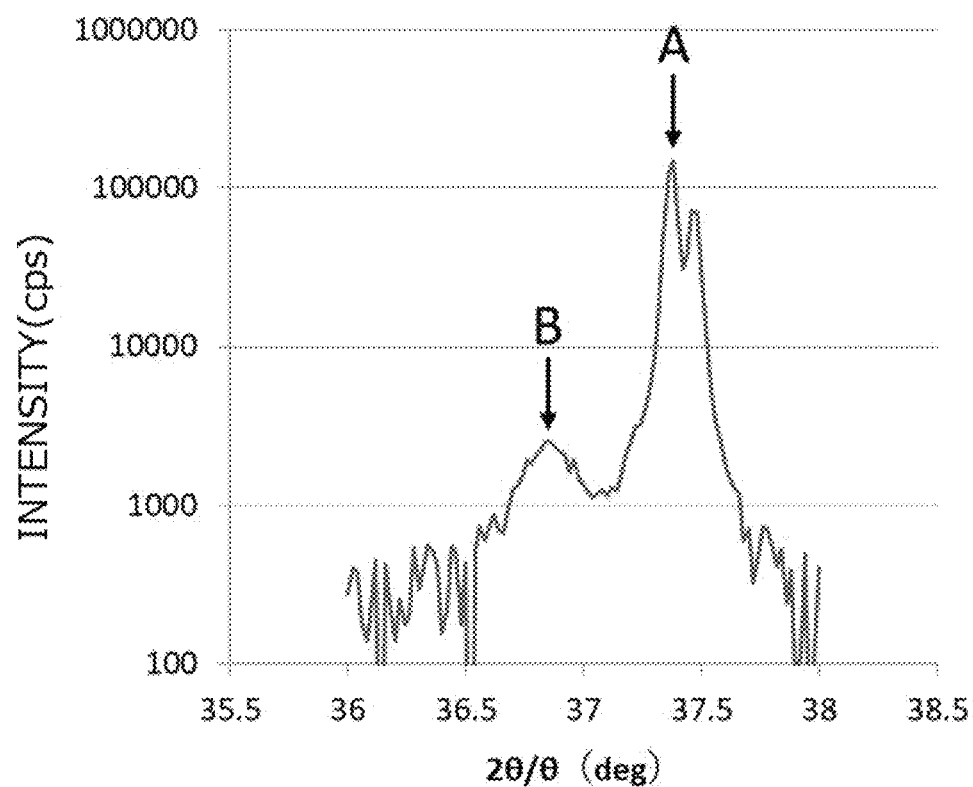
FIG. 7 is a diagram of X-ray diffraction of an LCO sample 3.

An X-ray diffraction diagram of the LCO sample 3 is shown in FIG. 7.

Here, the intensities of diffraction peaks were determined as ratios of heights of the diffraction peaks.

TABLE 6

| LCO Sample | Li/Co Feeding Ratio | Average Particle Diameter (μm) | BET Specific Surface Area (m²/g) |
|---|---|---|---|
| Sample 3 | 0.997 | 10.0 | 0.38 |

Example 3

30 g of the LCO sample 3 was taken and 0.125 g of magnesium oxide (MgO) and 0.061 g of titanium oxide ($TiO_2$) were added thereto, and fully mixed by a laboratory mill; and the obtained mixed material was subjected to heat treatment of firing at 800° C. for 5 hours to thereby obtain a positive electrode active substance sample having magnesium oxide and titanium oxide adhered.

Then, mapping of Ti atoms on the particle surface was carried out by SEM-EDX analysis of the obtained positive electrode active substance sample, and it was confirmed that Ti was present on part of the particle surface of the LCO sample 3.

The magnesium oxide used was an aggregate composed of a secondary particle formed by aggregation of primary particles. Then, the average particle diameter of the aggregate as measured by a laser diffraction scattering method was 3.6 μm, and the average particle diameter of the primary particles as determined by a SEM photograph was 0.5 μm.

The titanium oxide used was an aggregate composed of a secondary particle formed by aggregation of primary particles. Then, the average particle diameter of the aggregate as measured by a laser diffraction scattering method was 0.4 µm, and the average particle diameter of the primary particles as determined by a SEM photograph was 0.05 µm.

Here, the average particle diameter of the primary particles was determined by arbitrarily extracting 100 particles from the SEM observation.

Comparative Example 5

The LCO sample 3 was subjected, as it was, to heat treatment of firing at 800° C. for 5 hours to thereby obtain a positive electrode active substance sample. That is, in Comparative Example 5, no inorganic Mg compound nor inorganic Ti compound were mixed.

Comparative Example 6

A positive electrode active substance sample having titanium oxide adhered was obtained as in Example 3, except for adding no magnesium oxide.

Then, mapping of Ti atoms on the particle surface was carried out by SEM-EDX analysis of the obtained positive electrode active substance sample, and it was confirmed that Ti was present on part of the particle surface of the LCO sample 3.

TABLE 7

|  | LCO Sample | Amount Adhered (% by mol) | Firing Temperature (Heat Treatment Temperature) |
|---|---|---|---|
| Example 3 | Sample 3 | Mg: 1.0 Ti: 0.25 | 800° C. |
| Comparative Example 5 | Sample 3 | — | 800° C. |
| Comparative Example 6 | Sample 3 | Ti: 0.25 | 800° C. |

Note) The amount adhered is an amount in % by mol in terms of atom of Mg and/or Ti to Co in LCO sample.

<Battery Performance Test>

Coin-type lithium secondary batteries were fabricated as in Example 1 and Example 2, and subjected to a test for evaluation of the 4.6 V-cycle characteristics to evaluate the first-cycle capacity, the first-cycle charge and discharge efficiency, the capacity retention rate and the energy density retention rate. The results are shown in Table 8.

Figure 8:
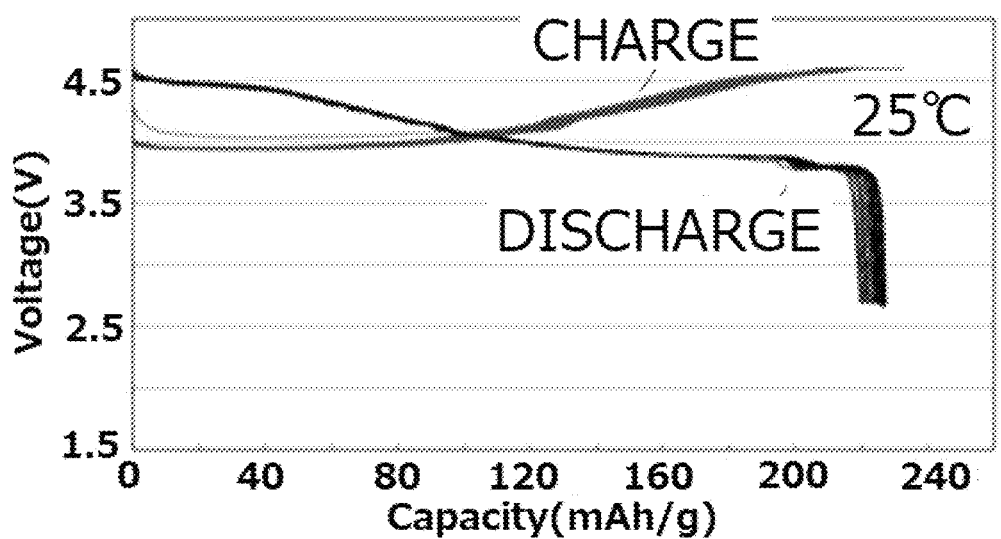
FIG. 8 is a diagram of charge and discharge characteristics of a lithium secondary battery using a positive electrode active substance sample obtained in Example 3.
Figure 9:
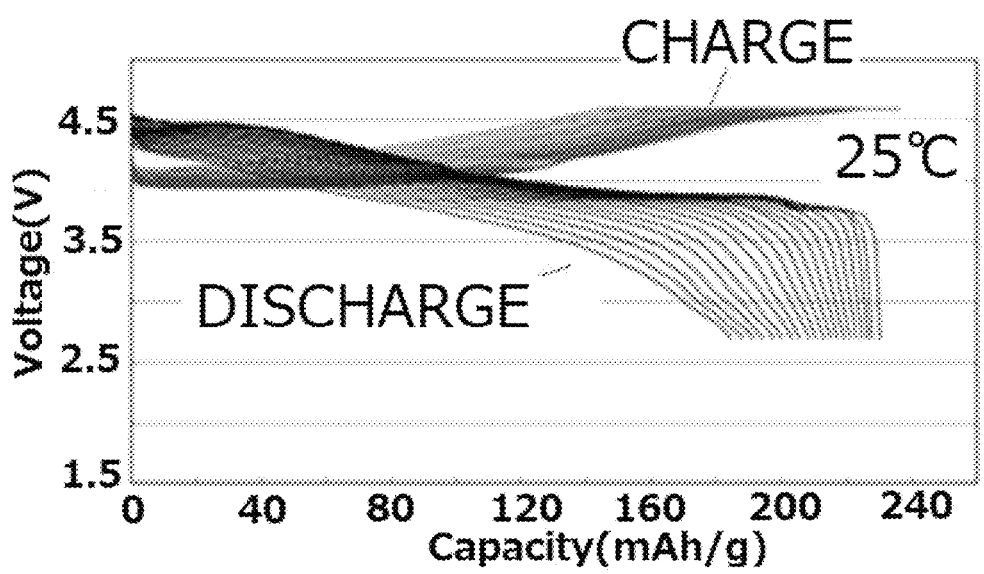
FIG. 9 is a diagram of charge and discharge characteristics of a lithium secondary battery using a positive electrode active substance sample obtained in Comparative Example 5.
Figure 10:
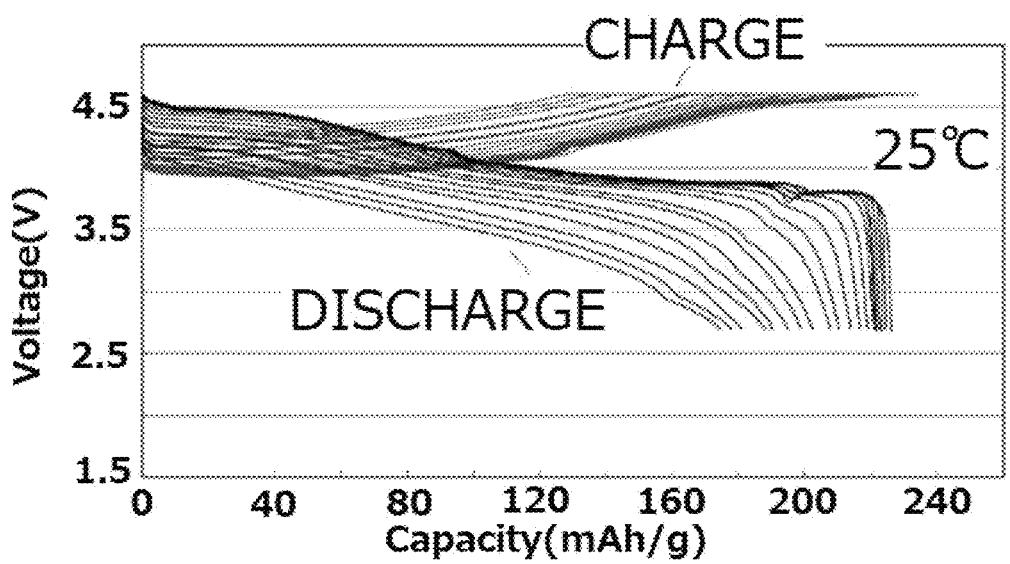
FIG. 10 is a diagram of charge and discharge characteristics of a lithium secondary battery using a positive electrode active substance sample obtained in Comparative Example 6.

There are shown in FIGS. 8 to 10, respectively, diagrams of charge and discharge characteristics of the lithium secondary batteries using the positive electrode active substance samples obtained in Example 3 and Comparative Examples 5 and 6.

The invention claimed is:

1. A method for producing a positive electrode active substance for a lithium secondary battery, wherein the positive electrode active substance for a lithium secondary battery is a lithium cobalt-based composite oxide particle having an inorganic Ti-containing compound as a Ti-containing compound and an inorganic Mg-containing compound as an Mg-containing compound adhered on at least part of a particle surface, the Ti-containing compound is adhered on the part of the lithium cobalt-based composite oxide particle surface, the method comprising: dry-mixing the lithium cobalt-based composite oxide particle wherein a molar ratio (Li/Co) in terms of atom of Li to Co is 0.90 to 1.20, the inorganic Mg-containing compound, and the inorganic Ti-containing compound to thereby obtain a mixed material of the lithium cobalt-based composite oxide particle, the inorganic Mg-containing compound and the inorganic Ti-containing compound wherein microparticles of the inorganic Mg-containing compound and inorganic Ti-containing compound are adhered on the lithium cobalt-based composite oxide particle surface; and then heat-treating the mixed material at 400 to 1,000° C. to thereby obtain the positive electrode active substance for a lithium secondary battery.

2. The method for producing a positive electrode active substance for a lithium secondary battery according to claim 1, wherein the inorganic Mg-containing compound is at least one selected from the group consisting of an oxide of Mg, a hydroxide of Mg, a sulfate salt of Mg, and a fluoride of Mg.

3. The method for producing a positive electrode active substance for a lithium secondary battery according to claim 1, wherein the inorganic Ti-containing compound is an oxide of Ti.

4. The method for producing a positive electrode active substance for a lithium secondary battery according to claim 1, wherein the lithium cobalt-based composite oxide comprises cobalt oxide ($Co_3O_4$).

5. The method for producing a positive electrode active substance for a lithium secondary battery according to claim 4, wherein with regard to a content of cobalt oxide ($Co_3O_4$) in the lithium cobalt-based composite oxide, when the lithium cobalt-based composite oxide is X-ray diffractometrically analyzed using a CuKα line as a line source, a ratio ((AB)×100) of an intensity (A) of the diffraction peak in the region of 2θ=36.8° caused by $Co_3O_4$ to an intensity

TABLE 8

|  | Charge Voltage (V) | First-Cycle Charge Capacity (mAh/g) | First-Cycle Discharge Capacity (mAh/g) | First-Cycle Charge and Discharge Efficiency (%) | Capacity Retention Rate (%) | Energy Density Retention Rate (%) |
|---|---|---|---|---|---|---|
| Example 3 | 4.6 | 232 | 228 | 98.2 | 96.8 | 96.8 |
| Comparative Example 5 | 4.6 | 236 | 230 | 97.7 | 80.1 | 72.2 |
| Comparative Example 6 | 4.6 | 233 | 228 | 97.9 | 76.5 | 65.9 |

(B) of the diffraction peak in the region of $2\theta=37.4°$ caused by $LiCoO_2$ is higher than 0.6% and 5.0% or lower.

* * * * *